(12) United States Patent
Gao et al.

(10) Patent No.: US 12,045,939 B2
(45) Date of Patent: Jul. 23, 2024

(54) MULTI-AGENT PATH PLANNING METHOD AND DEVICE, AND STORAGE MEDIUM

(71) Applicant: Tencent America LLC, Palo Alto, CA (US)

(72) Inventors: Xifeng Gao, Tallahassee, FL (US); Zherong Pan, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 230 days.

(21) Appl. No.: 17/827,602

(22) Filed: May 27, 2022

(65) Prior Publication Data

US 2023/0386136 A1    Nov. 30, 2023

(51) Int. Cl.
   *G06T 17/20*    (2006.01)
   *G06T 11/20*    (2006.01)
   *G06T 11/60*    (2006.01)

(52) U.S. Cl.
   CPC .......... *G06T 17/205* (2013.01); *G06T 11/206* (2013.01); *G06T 11/60* (2013.01); *G06T 2210/21* (2013.01)

(58) Field of Classification Search
   CPC ..... G06T 17/205; G06T 11/206; G06T 11/60; G06T 2210/21
   See application file for complete search history.

(56) References Cited

U.S. PATENT DOCUMENTS

2021/0273593 A1*    9/2021    Luthe .................. H02K 41/031

OTHER PUBLICATIONS

J. M. Palacios-Gasos et al., "Optimal path planning and coverage control for multi-robot persistent coverage in environments with obstacles," in 2017 IEEE International Conference on Robotics and Automation (ICRA), 2017, pp. 1321-1327. 7 pages.
K. M. Hasan et al., "Path planning algorithm development for autonomous vacuum cleaner robots," in 2014 International Conference on Informatics, Electronics Vision (ICIEV), 2014, pp. 1-6. 6 pages.
J. L. Baxter et al., "Multi-robot search and rescue: A potential field based approach," in Autonomous Robots and Agents, S. C. Mukhopadhyay and G. S. Gupta, Eds. Berlin, Heidelberg: Springer Berlin Heidelberg, 2007. 8 pages.

(Continued)

*Primary Examiner* — Michelle L Sams

(74) *Attorney, Agent, or Firm* — ANOVA LAW GROUP, PLLC

(57) ABSTRACT

A multi-agent path planning method is provided. The method includes: generating an initial mesh of a 2D floor plan of a space; optimizing the initial mesh to find a target mesh maximizing a value of a metric function, the metric function including a term reflecting a number of agents that a graph corresponding to a candidate mesh can hold and a term reflecting a number of agents in a largest connected component of the graph corresponding to the candidate mesh, the candidate mesh being a mesh; converting the target mesh into a target graph, each vertex of the target graph representing a position that an agent can reside at, and each edge of the target graph representing a path that an agent can travel on; and planning paths for the plurality of agents according to origins and destinations of the agents and the graph, wherein the agents traveling on the planned paths do not collide with each other.

20 Claims, 17 Drawing Sheets

(56) References Cited

OTHER PUBLICATIONS

J. E. Hopcroft et al., "On the Complexity of Motion Planning for Multiple Independent Objects: PSPACE—Hardness of the "Warehouseman's Problem"," The international journal of robotics research, vol. 3, No. 4, pp. 76-88, 1984. 13 pages.

P. Spirakis et al., "Strong np-hardness of moving many discs," Information Processing Letters, vol. 19, No. 1, pp. 55-59, 1984. 5 pages.

G. Sanchez et al., "On delaying collision checking in PRM planning: Application to multi-robot coordination," The International Journal of Robotics Research, vol. 21, No. 1, pp. 5-26, 2002. 22 pages.

D. Le et al., "Cooperative multi-robot sampling-based motion planning with dynamics," in ICAPS, 2017, pp. 513-521. 9 pages.

G. Sharon et al., "Conflict-based search for optimal multi-agent pathfinding," Artificial Intelligence, vol. 219, pp. 40-66, 2015. 27 pages.

V. Auletta et al., "A linear-time algorithm for the feasibility of pebble motion on trees," Algorithmica, vol. 23, No. 3, pp. 223-245, 1999. 23 pages.

R. Luna et al., "Push and swap: Fast cooperative path-finding with completeness guarantees," in International Joint Conferences in Artificial Intelligence (IJCAI-11), Barcelona, Spain, 2011. 7 pages.

J. Yu et al., "Pebble motion on graphs with rotations: Efficient feasibility tests and planning algorithms," in Algorithmic foundations of robotics XI, Springer, 2015, pp. 729-746. 18 pages.

D. Kornhauser et al., "Coordinating pebble motion on graphs, the diameter of permutation groups, and applications," in 25th Annual Symposium on Foundations of Computer Science, 1984, pp. 241-250. 10 pages.

J. Yu, "Average case constant factor time and distance optimal multi-robot path planning in well-connected environments," Autonomous Robots, 2019. 15 pages.

Shuai D. Han et al., "Sear: A polynomial-time multi-robot path planning algorithm with expected constant-factor optimality guarantee," in 2018 IEEE/RSJ International Conference on Intelligent Robots and Systems, IROS 2018, Madrid, Spain, Oct. 1-5, 2018, IEEE, 2018. 8 pages.

R. Chinta et al., "Coordinating the motion of labeled discs with optimality guarantees under extreme density," arXiv:1807.03347v1, Jul. 9, 2018. 14 pages.

H. Hoppe et al., "Mesh optimization," in Proceedings of the 20th annual conference on Computer graphics and interactive techniques, 1993. 8 pages.

J. Van Den Berg et al., "Centralized path planning for multiple robots: Optimal decoupling into sequential plans," in Robotics: Sciences and Systems, Jun. 2009. pages.

J. Yu et al., "Optimal multi-robot path planning on graphs: Complete algorithms and effective heuristics," IEEE Transactions on Robotics, vol. 32, No. 5, pp. 1163-1177, 2016. 15 pages.

J. Li et al., "EECBS: A bounded-suboptimal search for multi-agent path finding," arXiv:2010.01367v2, Mar. 12, 2021. 10 pages.

G. Gange et al., "Lazy CBS: Implicit conflict-based search using lazy clause generation," in ICAPS, 2019, pp. 155-162. 3 pages.

A. Sinha et al., "A review on bilevel optimization: From classical to evolutionary approaches and applications," IEEE Transactions on Evolutionary Computation, vol. 22, No. 2, pp. 276-295, 2017. 20 pages.

M. Laurent, "Sums of squares, moment matrices and optimization over polynomials," in Emerging applications of algebraic geometry, Springer, 2009, pp. 157-270. 114 pages.

X. Gao et al., "Multi-robot path planning in complex environments via graph embedding," arXiv:2108.03368v1, Aug. 7, 2021. 9 pages.

Y. Hu et al., "Tetrahedral meshing in the wild," ACM Trans. Graph., vol. 37, No. 4, 2018. 14 pages.

X.-M. Fu et al., "Computing locally injective mappings by advanced MIPS," ACM Trans. Graph., vol. 34, No. 4, 2015. 12 pages.

T. K. Dey et al., "Topology preserving edge contraction," Publ. Inst. Math. (Beograd), 1998. 13 pages.

D. Defays, "An efficient algorithm for a complete link method," The Computer Journal, vol. 20, No. 4, pp. 364-366, 1977. 3 pages.

A. Andreychuk et al., "Multi-agent pathfinding with continuous time," in Proceedings of the Twenty-Eighth International Joint Conference on Artificial Intelligence, IJCAI-19, International Joint Conferences on Artificial Intelligence Organization, Jul. 2019, pp. 39-45. 7 pages.

\* cited by examiner

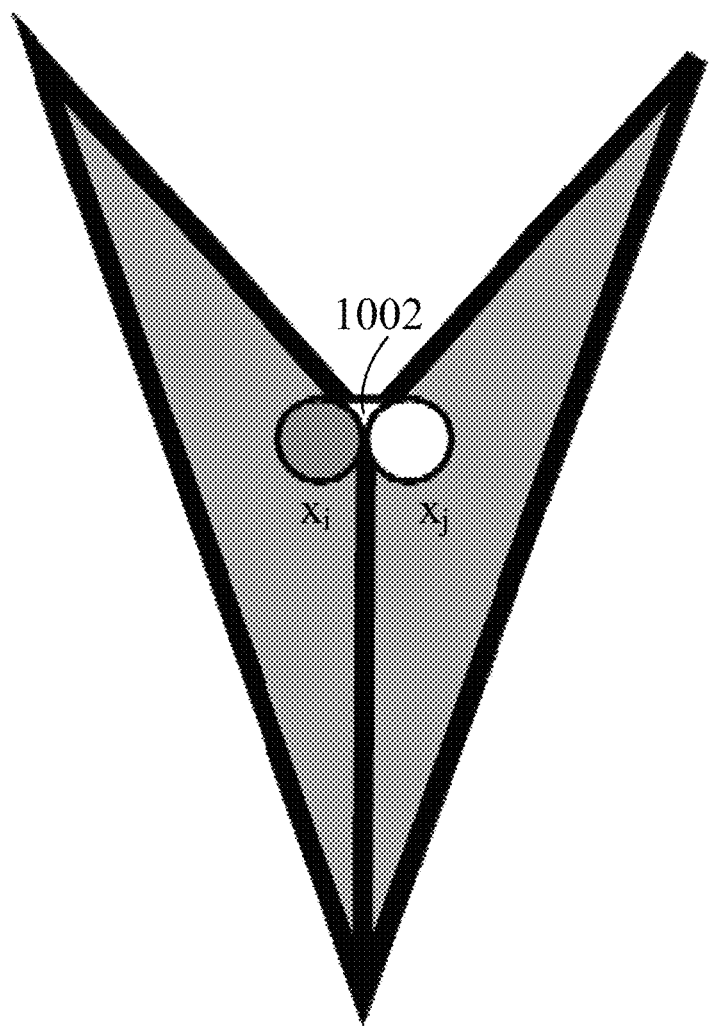
FIG. 10A
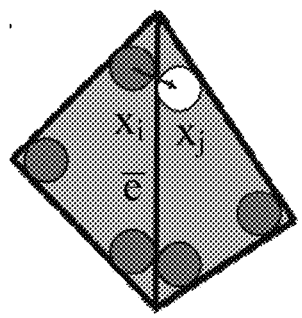 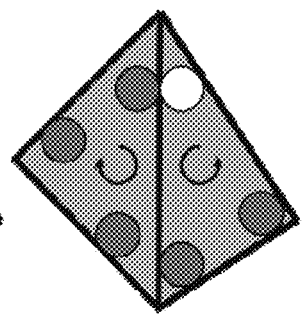 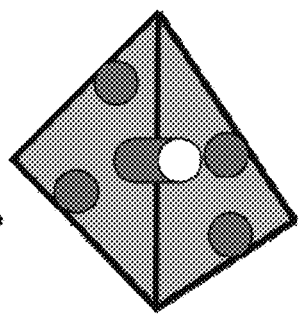 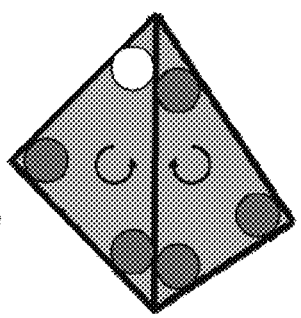
FIG. 10B     FIG. 10C     FIG. 10D     FIG. 10E

MULTI-AGENT PATH PLANNING METHOD AND DEVICE, AND STORAGE MEDIUM

FIELD OF THE TECHNOLOGY

This application relates to the field of computational geometry technologies and, specifically, to a multi-agent path planning method, device, and storage medium.

BACKGROUND

Multi-agent path planning (MPP) aims at routing multiple agents from their distinct start to goal positions in a complex environment, which is widely used in various applications, such as warehouse arrangement, coverage planning for floor vacuuming, and inspection planning for search and rescue. These real-world applications often require MPP planners to answer queries in continuous space. A common practice is to convert continuous spaces into discrete problems. However, existing solutions for converting a continuous space into a discrete space have poor quality of discretization that can negatively affect the quality of discrete MPP solutions. Start and goal positions in continuous space need to be associated with discrete start/goal nodes after discretization. If the positions and nodes are close enough, agents can simply move to the start node without conflict. However, a poor discretization can prevent this. As shown in FIG. 1A, for example, a lattice-style triangulation is not boundary aligned and can miss start/goal positions in the corners of the star-shaped world. Another example, as shown in FIG. 1C, is to capture environments with narrow passages, where regular titling can easily miss the narrow regions.

The disclosed methods and systems are directed to solve one or more problems set forth above and other problems.

SUMMARY

Embodiments of the present disclosure introduce a multi-agent planning process. In the process, a two-dimensional (2D) floor plan of a space is obtained. The 2D floor plan is discretized to generate an initial mesh including a plurality of triangle cells. A mesh optimization process is performed on the initial mesh to find a target mesh that maximizes a value of a metric function. The metric function include at least: a term reflecting a number of agents that a graph corresponding to a candidate mesh can hold and a term reflecting a number of agents in the largest connected component of the graph corresponding to the candidate mesh, the candidate mesh being a mesh obtained in the mesh optimization process. A target graph is obtained from the target mesh, each vertex of the target graph representing a position that an agent can reside at, and each edge of the target graph representing a path that an agent can travel on. The target graph is used for planning paths for a plurality of agents according to origins and destinations of the plurality of agents in the space, and the agents traveling on the planned paths do not collide with each other.

One aspect of the present disclosure provides a multi-agent path planning method. The method includes: obtaining a two-dimensional (2D) floor plan of a space; generating an initial mesh of the 2D floor plan, the initial mesh discretizing the 2D floor plan into a plurality of triangle cells; performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; converting the target mesh into a target graph, each vertex of the target graph representing a position that an agent can reside at, and each edge of the target graph representing a path that an agent can travel on. The target graph is used for planning paths for a plurality of agents according to origins and destinations of the plurality of agents in the space, and the agents traveling on the planned paths do not collide with each other.

Another aspect of the present disclosure provides a device for multi-agent path planning, including a processor and a memory. The processor is configured to perform: obtaining a 2D floor plan of a space; generating an initial mesh of the 2D floor plan, the initial mesh discretizing the 2D floor plan into a plurality of triangle cells; performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; converting the target mesh into a target graph, each vertex of the target graph representing a position that an agent can reside at, and each edge of the target graph representing a path that an agent can travel on. The target graph is used for planning paths for a plurality of agents according to origins and destinations of the plurality of agents in the space, and the agents traveling on the planned paths do not collide with each other.

Another aspect of the present disclosure provides a non-transitory storage medium storing computer instructions. The computer instructions, when executed by a processor, cause the processor to perform: obtaining a 2D floor plan of a space; generating an initial mesh of the 2D floor plan, the initial mesh discretizing the 2D floor plan into a plurality of triangle cells; performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; converting the target mesh into a target graph, each vertex of the target graph representing a position that an agent can reside at, and each edge of the target graph representing a path that an agent can travel on. The target graph is used for planning paths for a plurality of agents according to origins and destinations of the plurality of agents in the space, and the agents traveling on the planned paths do not collide with each other.

Other aspects of the present disclosure can be understood by those skilled in the art in light of the description, the claims, and the drawings of the present disclosure.

BRIEF DESCRIPTION OF THE DRAWINGS

FIG. 10A-FIG. 10E illustrate collision situations of vacant moves along an inter-cell edge consistent with certain embodiments of the present disclosure;

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

Figure 1A:
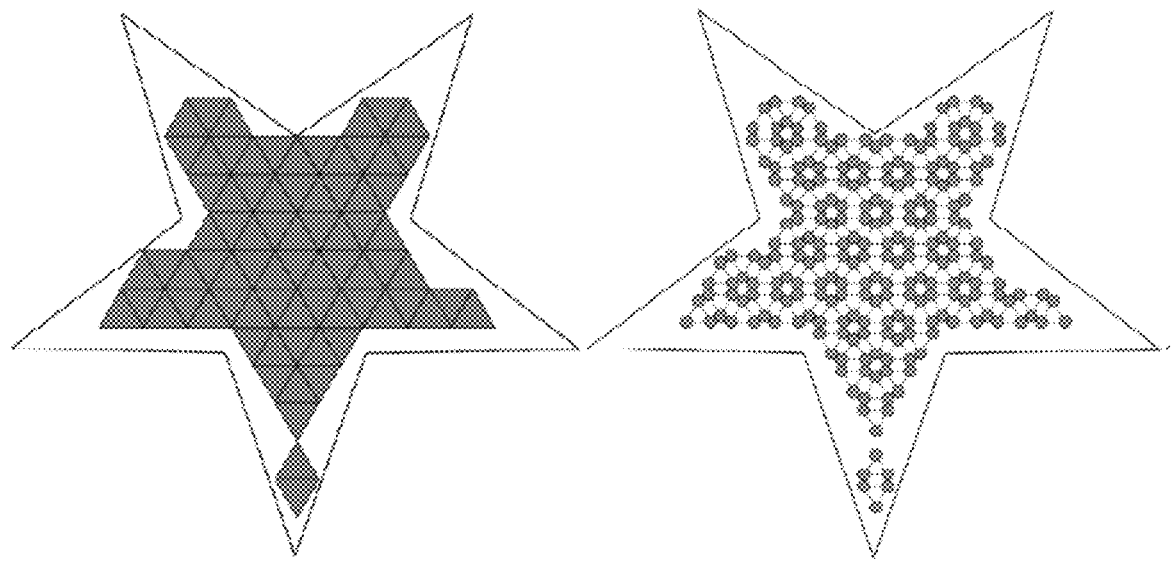
FIGS. 1A and 1B illustrate examples of triangulation and discretization results of a star-shaped environment.
Figure 1B:
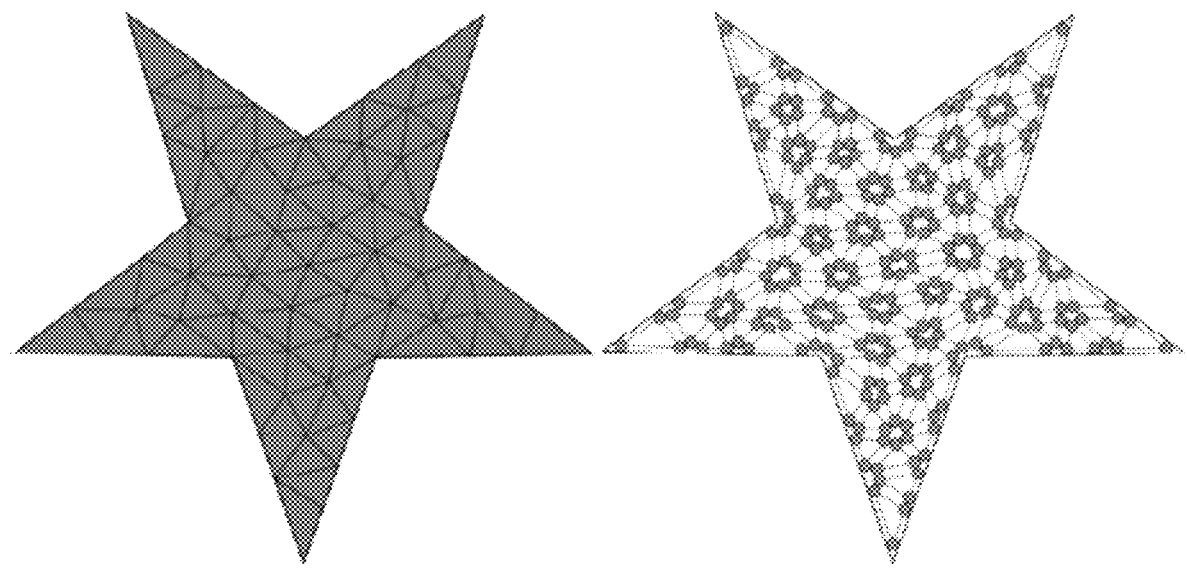
Figure 1C:
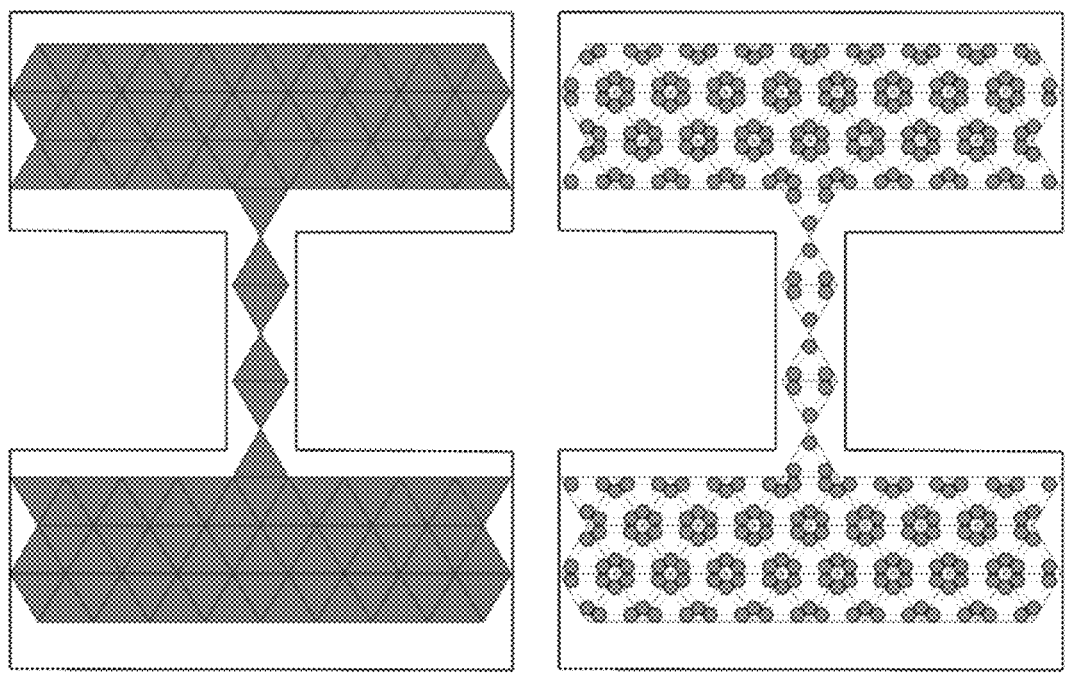
FIG. 1C and FIG. 1D illustrate examples of triangulation and discretization result of an environment with a narrow passage.
Figure 1D:
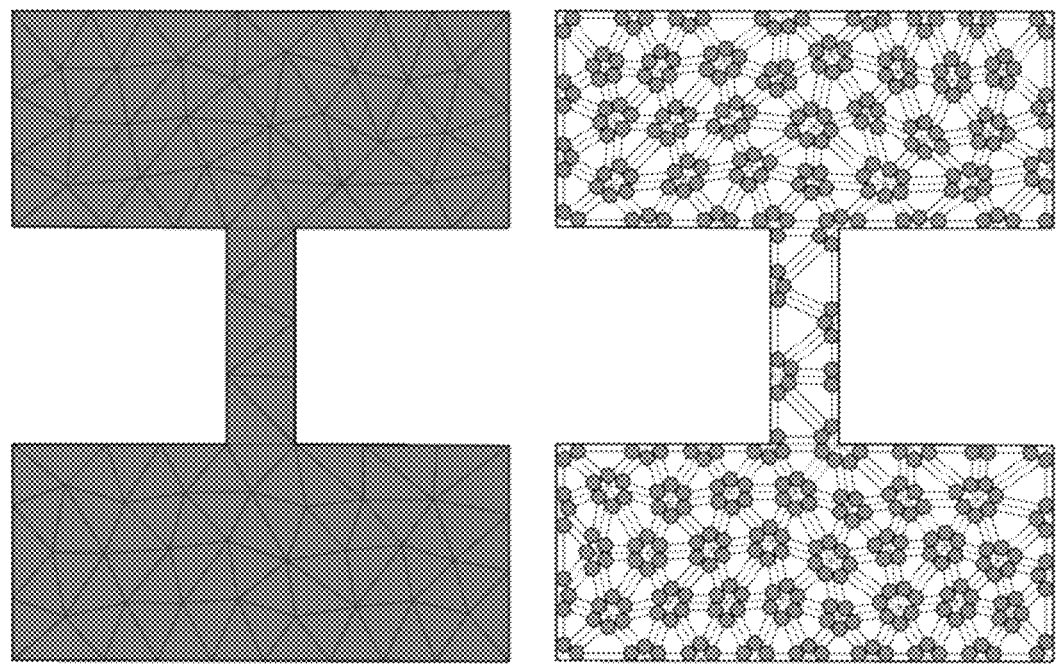
Figure 2:
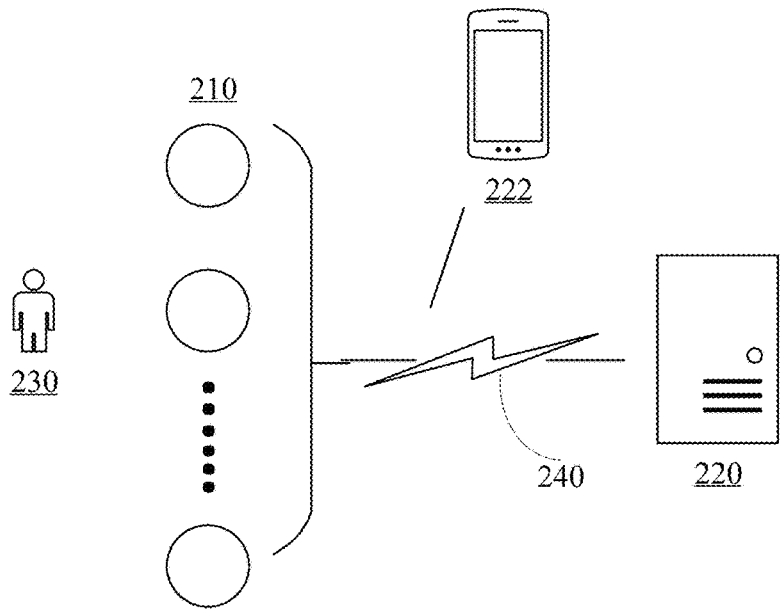
FIG. 2 illustrates an operating environment incorporating certain embodiments of the present disclosure.

FIG. 2 shows an operating environment 200 incorporating certain embodiments of the present disclosure. As shown in FIG. 2, the operating environment 200 may include multiple movable agent devices 210, one or more computing devices such as a server 220 or a terminal device 222, and a communication link 240 connecting the multiple movable agent devices 210 to the one or more computing devices. Other types of devices may also be included. A user 230 may use, access, or control one or more of the variety of devices.

The terminal device 222 may include any user terminal, such as a personal digital assistant (PDA), a mobile phone, a smart phone, an integrated messaging device (IMD), a tablet computer, a notebook computer, a desktop computer, an IoT device and other computing devices.

The server 220 may include any type of server computer system or multiple computer systems configured in a server cluster or distributed in different locations. The server 122 may also include a cloud server on a cloud computing platform. The server 220 may also be referred as a server entity, which may be integrated with any appropriate device (including the terminal device 222) for performing the disclosed functionalities of multi-agent path planning.

The communication link 240 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 240 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

In operation, the one or more computing devices 220 and/or 222 can determine moving paths of the multiple agent devices 210 in a two-dimensional (2D) space. The multiple agent devices 210 can move in the 2D space according to the generated paths. For example, the agent devices 210 can be remotely controlled by the computing devices 220 and/or 222 to move along a designated path. Alternatively, the agent devices 210 can move along a designated path at a scheduled time based on data loaded on its local memory in advance. In another example, the multiple agent devices 210 are virtual objects and can move along paths planned by the computing devices 220 and/or 222 in a 2D virtual space. The disclosed path planning method can be applied in the virtual space to avoid virtual objects colliding with or crossing through each other, and avoid other unrealistic or unreasonable appearances such as crossing through other models and/or structures in the virtual space. The virtual objects and the 2D virtual space may be implemented on the computing devices 220 and/or 222 that plans the paths, or other computing devices that obtains the planned paths from the computing devices 220 and/or 222.

Figure 3:
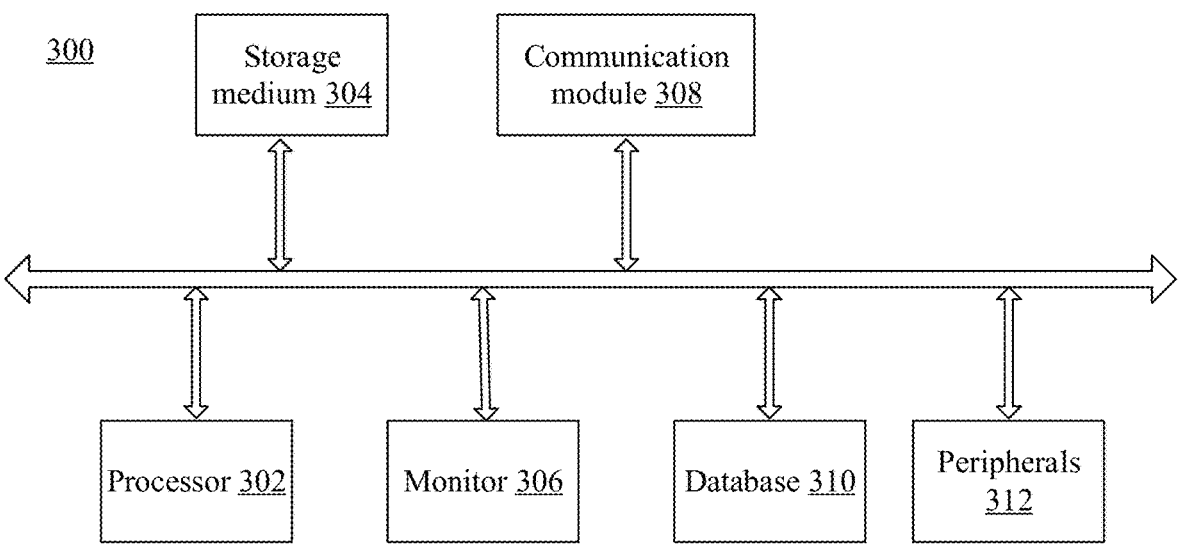
FIG. 3 illustrates a computer system consistent with embodiments of the present disclosure.

FIG. 3 illustrates an exemplary computer system implementing certain aspects of a computing device and/or an agent device. As shown in FIG. 3, computer system 300 may include a processor 302, storage medium 304, a monitor 306, a communication module 308, a database 310, and peripherals 312. The components shown in FIG. 3 are illustrative, certain components may be omitted, and other components may be added.

Processor 302 may include any appropriate processor or processors. Further, processor 302 can include multiple cores for multi-thread or parallel processing. Processor 302 may be connected to other components through one or more bus or other electrical connections to send data to and receive data from the other components. Processor 302 may be implemented by using at least one hardware form of digital signal processing (DSP), a field-programmable gate array (FPGA), and a programmable logic array (PLA). Processor 302 may also include a main processor and a coprocessor. The main processor may be a central processing unit (CPU), and the coprocessor may be a graphics processing unit (GPU) configured to be responsible for rendering and drawing content that a display screen needs to display. Storage medium 304 may include memory modules, such as Read-only Memory (ROM), Random Access Memory (RAM), flash memory modules, and erasable and rewritable memory, and mass storages, such as CD-ROM, U-disk, and hard disk, etc. Storage medium 304 may store computer programs for implementing various processes, when executed by processor 302. Communication module 308 may include network devices for establishing connections through the communication link 240.

In a computer system 300 that implements the computing device 220 or 222, peripherals 312 may include I/O devices such as a keyboard and a mouse. Database 310 may include one or more databases for storing certain data and for performing certain operations on the stored data, such as database searching. Monitor 306 may be any suitable display technology suitable to display an image or video. For example, monitor 306 may include a liquid crystal display (LCD) screen, an organic light-emitting diode (OLED) screen, or the like, and may be a touch screen.

In a computer system 300 that implements virtual agent devices 210. Processor 302 may execute an application program that generates and/or controls the virtual agent devices 210. Monitor 306 may display movements of the virtual agent devices 210 in a virtual map according to planned paths.

In a computer system 300 that implements a physical agent device 210, peripherals 312 may include one or more sensors that may sense the spatial disposition, velocity, and/or acceleration of the agent device 210. Examples of the sensors may include but are not limited to: location sensors (e.g., global positioning system (GPS) sensors, mobile device transmitters enabling location triangulation), image sensors (e.g., imaging devices capable of detecting visible, infrared, and/or ultraviolet light, such as a camera), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). The agent device 210 may also include a propulsion system configured to enable the agent device 210 to perform a desired movement (e.g., in response to a control signal from onboard processor 302 and/or remotely transmitted from a computing device 220 or 222), such as moving along a designated path, stopping at a desired location, etc. The propulsion system 104 may include one or more of any suitable propellers, blades, rotors, motors, engines and the like to enable movement of the agent device 210.

The present disclosure provides a method and system for multi-agent path planning (MPP). MPP aims at routing multiple agents (e.g., robots) from their distinct start to goal positions in a complex environment, which is a unified theoretical model of various applications, including warehouse arrangement, coverage planning for floor vacuuming, inspection planning for search and rescue, virtual object moving planning in gaming maps. These real-world applications often require MPP planners to answer queries in continuous space. However, determining the feasibility of continuous MPP instances have been shown to be PSPACE-hard (for rectangular objects) and strongly NP-hard (for polygonal environments), even for simplified MPP instances, let along environments with complex shapes. It is thus unsurprising that brute-force search algorithms are only practical for tens of robots. MPP becomes much more tractable in discrete space by assuming that agents can only move on a discrete graph, i.e., agents reside in a discrete set of vertices and move along a discrete set of paths connecting the vertices. MPP in discrete space is also referred as multi-agent path finding (MAPF), for which polynomial-time algorithms exist for checking the feasibility and finding feasible solutions. For special graphs, the sub-optimality of solutions can be bounded.

Embodiments of the present disclosure provides methods and systems to translate complex, continuous spaces into graph representations in a way that maximizes free space coverage, ensures collision-free motion when moving along the graph, and guarantees feasibility of discrete MPP problems posed on the graph. In other words, the disclosed method leverages computer graphics and graph embedding techniques to approximate continuous MPP problems as discrete MPP problems with high fidelity. The graph generated based on the disclosed method has special topology and geometry conditions, on which any MAPF instance is guaranteed to be feasible. The graph can be topologically identified with a planar triangle mesh, where the feasibility conditions of the discrete MPP instances can be mapped to differentiable geometric constraints. Further, embodiments of the present disclosure provide a greedy triangle mesh optimization framework to embed the graph on environments with complex boundaries, so that both the agent capacity and the free space coverage of the graph can be optimized under the feasibility conditions. In addition, a space-time search algorithm is provided for the graph to quickly answer discrete MPP queries for a large number of congested robots, making use of the guaranteed feasibility.

Figure 4:
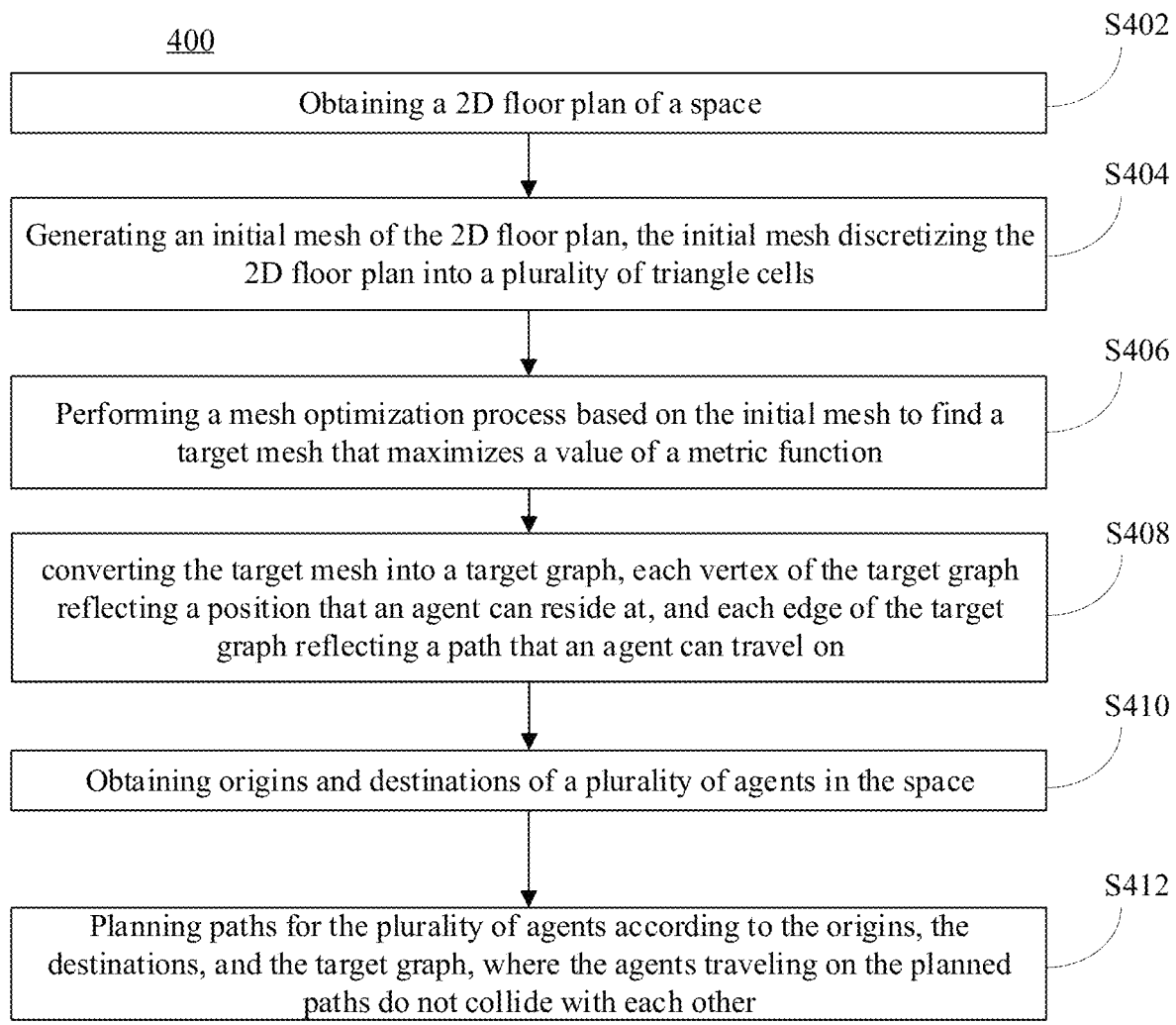
FIG. 4 illustrates a multi-agent path planning process consistent with embodiments of the present disclosure.

FIG. 4 illustrates a multi-agent path planning process 400 consistent with embodiments of the present disclosure. The process 400 can be implemented by the computing system 300 in the operating environment 200.

As shown in FIG. 4, a two-dimensional (2D) floor plan of a space is obtained (S402). The space can be any suitable environment where multi-agent path planning is desired, such as buildings, malls, warehouses and/or gaming maps. The 2D floor plan may be obtained/extracted from a 3D space model. For example, the 3D space model may include a plurality of 2D plans at different heights. The 2D floor plan may be extracted based on a certain height. In another example, a mapping may be performed on a 3D space corresponding to a certain plane, to obtain the 2D floor plan. The 2D floor plan of the space may referred as a workspace. For a workspace $\mathcal{W} \subset \mathbb{R}^2$ with piecewise linear boundaries, it is assumed that all agents involved in the discrete MPP problems are disk-shaped with an identical radius r. Accordingly, the ith agent centered at $x_i \supset \mathcal{W}$ takes up the space of a circular region:

$$C(x_i) \triangleq \{x \mid \|x - x_i\| \le r\} \subset \mathcal{W}.$$

An agent, as used herein, may refer to an object configured to move in $\mathcal{W}$ according to a planned path. One example of an agent is a robot. It can be understood that robots mentioned in the following embodiments can be replaced with other types of agents.

Figure 5A:
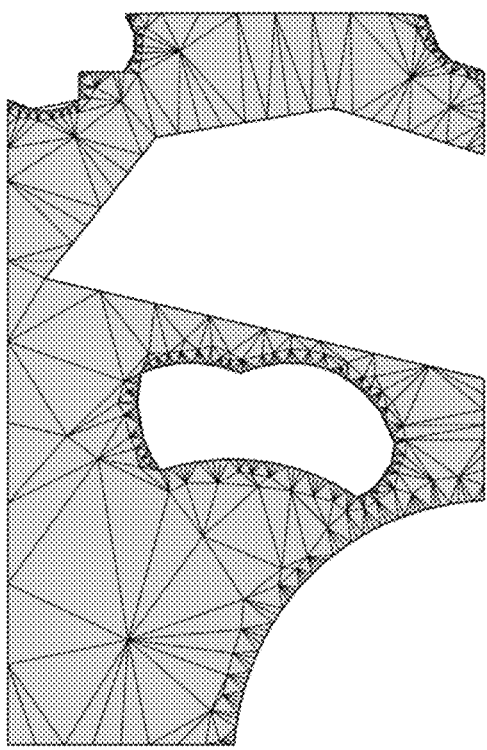
FIG. 5A illustrates an example initial mesh consistent with certain embodiments of the present disclosure.

An initial mesh of the 2D floor plan is generated from the 2D floor plan, the initial mesh discretizing the 2D floor plan (i.e., $\mathcal{W}$) into a plurality of triangle cells (S404). The initial mesh is a guess of triangular cells to be optimized. For example, the initial mesh can be generated using constrained Delaunay Triangulation. FIG. 5A illustrates an example initial mesh consistent with certain embodiments of the present disclosure.

Figure 5B:
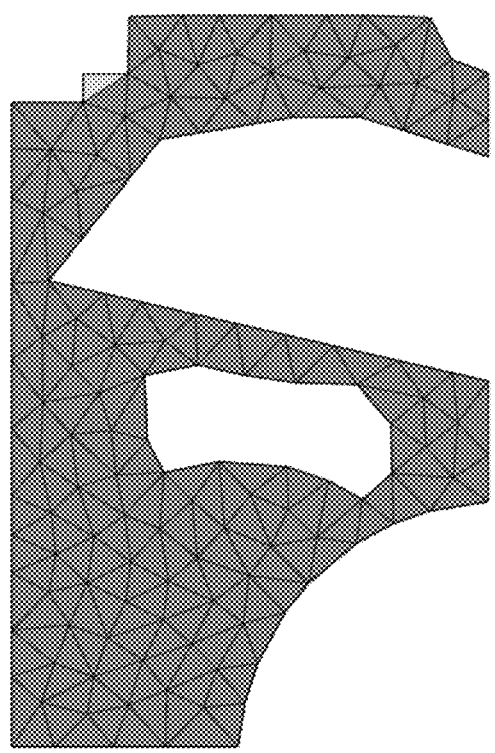
FIG. 5B illustrates an example target mesh corresponding the initial mesh shown in FIG. 5A using a mesh optimization process consistent with certain embodiments of the present disclosure.

A mesh optimization process is performed based on the initial mesh to find a target mesh that maximizes a value of a metric function (S406). FIG. 5B illustrates an example target mesh corresponding the initial mesh shown in FIG. 5A using the mesh optimization process consistent with certain embodiments of the present disclosure. The metric function including at least: a term reflecting a number of agents that a graph corresponding to a candidate mesh can hold and a term reflecting a number of agents in the largest connected component of the graph corresponding to the candidate mesh, the candidate mesh being a mesh obtained in the mesh optimization process. Details of the mesh optimization process and metric function will be described below in embodiments with references to FIGS. 11A-11E and Table 2.

Figure 6A:
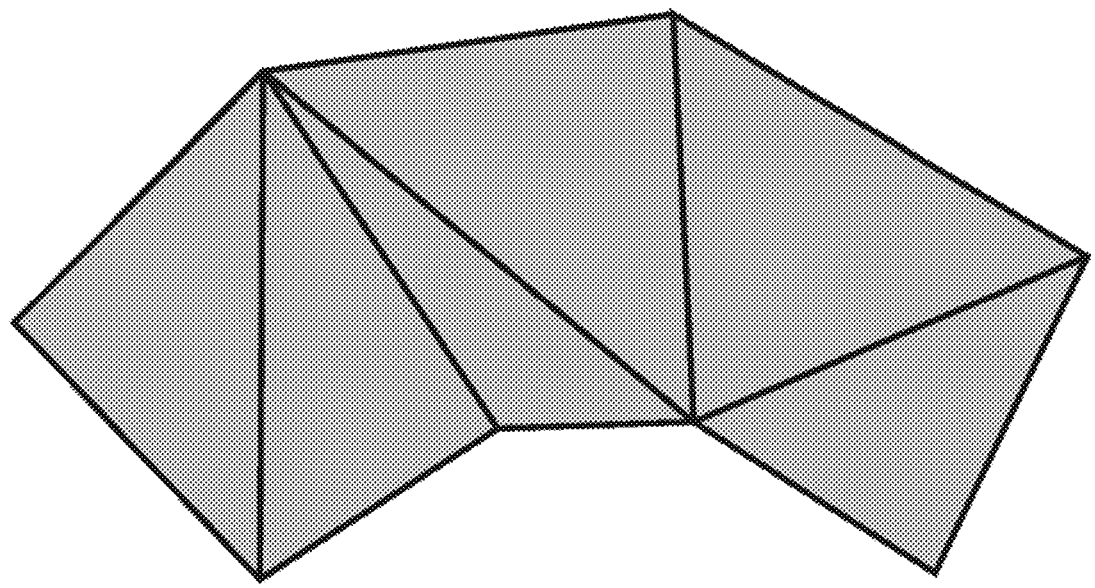
FIGS. 6A, 6B, and 6C illustrate an example conversion from a mesh into a graph consistent with certain embodiments of the present disclosure.
Figure 6B:
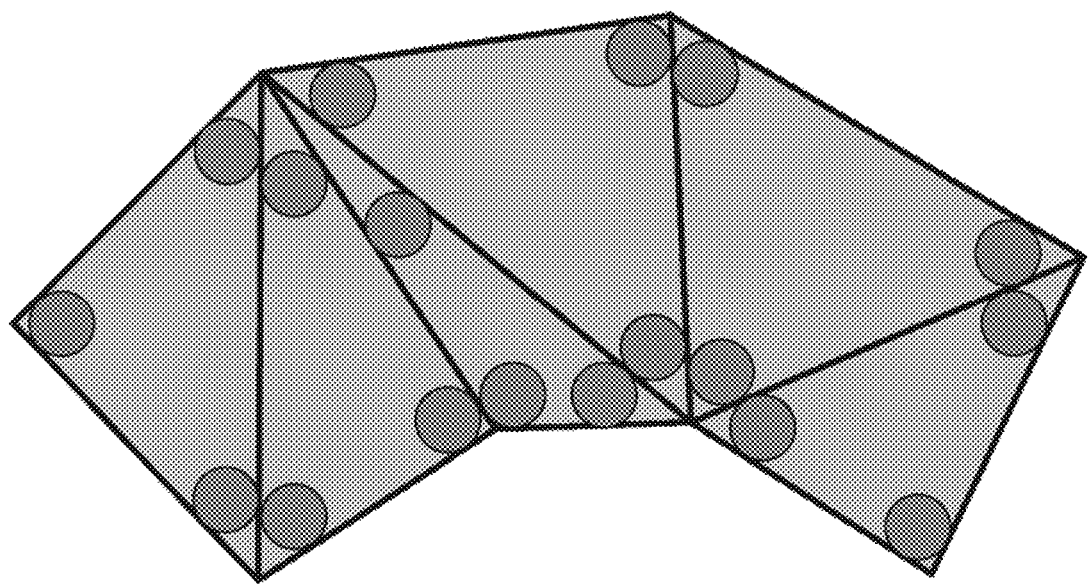
Figure 6C:
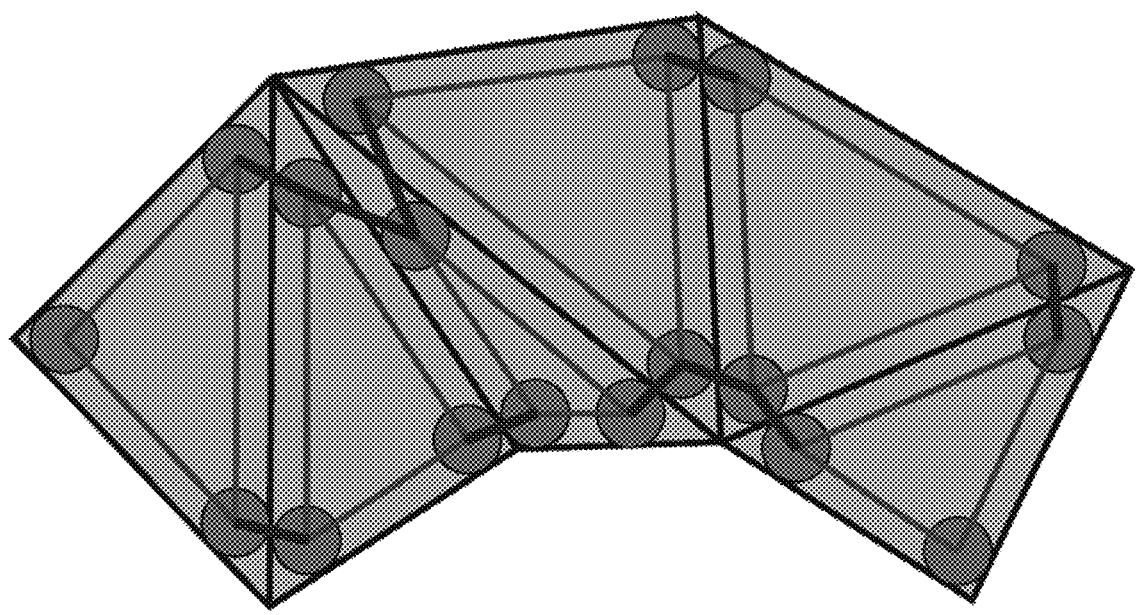

The target mesh is converted into a graph, each vertex of the target graph representing a position that an agent can reside at, and each edge of the target graph representing a path that an agent can travel on (S408). FIGS. 6A, 6B, and 6C illustrate an example conversion from a mesh into a graph consistent with certain embodiments of the present disclosure. FIG. 6A is a mesh discretizing $\mathcal{W}$, which is a decomposition with straight-line edges and triangular cells. When converting the mesh into a graph, robots are put on corner points of the triangular cells as vertices of the graph, as shown in FIG. 6B. Further, as shown in FIG. 6C, loop edges (thin lines) for robots in a single cell are created for the graph, and inter-cell edges (thick lines) between robots of neighboring cells are created for the graph. Details of the graph mapping/conversion from a mesh will be described below in embodiments with references to FIGS. 7-11E and Table 1.

Returning to FIG. 4, in some embodiments, process 400 may further include obtaining origins and destinations of a plurality of agents in the space (S410). Each origin and each destination have a corresponding vertex in the graph. In some embodiments, the origins and destinations are at the same positions as their corresponding vertices. In some embodiments, a vertex located at the closest position to an origin or a destination is identified as the corresponding vertex of the origin or the destination.

Paths for the plurality of agents are planned according to the origins, the destinations, and the target graph, where the agents traveling on the planned paths do not collide with each other (S412). In some embodiments, the planned paths are described as edges of the graph, and vertices in the graph corresponding to the origins and the destinations of the agents are used as starting points and ending points in the path finding process. When an actual origin or an actual destination of agent is not exactly located at its corresponding vertex, the agent can be guided to move to the origin before moving on a planned path, or to the destination after moving on the planned path. In some embodiments, the planned paths can be distributed to the agents so that the agents can move in the space (e.g., mall, warehouse) according to the planned paths. The planned paths may include information about whether to move or stop at a current position corresponding to a vertex in the graph at each round, and if it is a move, a position corresponding to a target vertex that the agent should move to in this round. The agents may perform certain operations at the origins and/or the destination, such as picking up, dropping off an item. The agents may perform certain operations at the origins and/or the destination, such as picking up, dropping off an item. The agents may perform certain operations while moving, such as mopping, vacuuming, etc.

In some embodiments, a conflict-based-searches (CBS) algorithm can be used to solve MPP problems on the graphs generated based on embodiments of the present disclosure. A CBS algorithm is directed to find near optimal solutions. In some embodiments, a space-time parallel scheduling approach can be used for large swarms of congested robots. Details of the path finding solutions and space-time scheduler will be described below in embodiments with references to FIGS. 12-13 and Table 4.

Embodiments of the present disclosure also provides a device or a system for multi-agent path planning. The device may be implemented on the computing system shown in FIG. 3. The device (e.g., processor 302) can perform the process described in accordance with FIG. 4 and operations discussed in embodiments below. Embodiments of the present disclosure also provides a non-transitory storage medium storing computer instructions. The computer instructions, when executed by a processor, cause the processor to perform the process shown in FIG. 4 and operations discussed in embodiments below. The foregoing storage medium may include but is not limited to any medium that can store program code, such as a USB flash drive, a ROM, a RAM, a removable hard disk, a magnetic disk, or a compact disc.

In the following description, a list of conditions will be discussed for embedding $\mathcal{G}$ into a triangulation of $\mathcal{W}$ (i.e., target mesh) in accordance with step S408 while allowing robots to perform cyclic and vacant moves in a collision-free manner. Then details of mesh optimization algorithm in accordance with step S406 to maximize a value of the metric function that encodes different requirements for a desired $\mathcal{G}$ will be described. Later embodiments provide space-time path planning algorithm that schedules simultaneous robot motions on a discrete graph in accordance with step S412.

In an example embodiment, a graph $\mathcal{G} = \langle \mathcal{X}, \varepsilon \rangle$ (i.e., converted from a mesh discretizing $\mathcal{W}$) can be embedded into $\mathcal{W}$ and used to construct the discrete subset MPP problems. $\mathcal{G}$ can restrict robot motions, i.e., robots can only reside on $\mathcal{X}$ and move along $\varepsilon$. Here $\mathcal{X}$ is the set of vertices $$\mathcal{X} \triangleq \{x_1, \ldots, x_{|\mathcal{X}|}\}.$$

$\varepsilon$ is the set of edges connecting vertices in $\mathcal{X}$. A direct path connecting two positions in $\mathcal{W}$ and a graph edge can be referred interchangeably in the present disclosure. The disclosed process 400 provides a solution that computes a graph embedding $\mathcal{G}$ of $\mathcal{W}$ so that: 1) discrete MPP problems on $\mathcal{G}$ is guaranteed to have feasible collision-free solutions, where the ith robot moves from $x_i$ to $x_{\sigma(i)}$ with $\sigma$ being a position permutation; 2) the number of vertices of $\mathcal{G}$ is maximized to enable large swarms of robots in simultaneous navigation; 3) $\mathcal{W}$ is covered as much as possible to provide desired approximations for continuous MPP problems.

Embodiments in accordance with the disclosed method and system is based on an observation that a special graph $\mathcal{G}$ not only allows guaranteed feasible collision-free solutions, but also is constructible from a triangulation of $\mathcal{W}$ by enforcing collision-free conditions on the triangle mesh.

Figure 7:
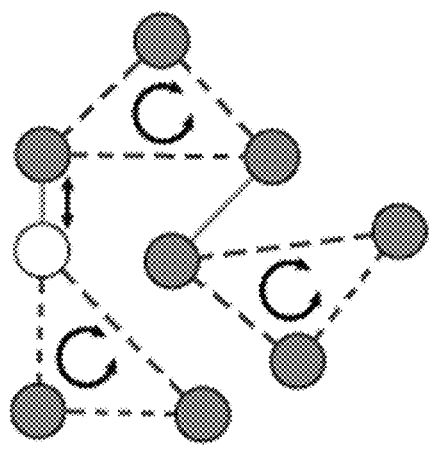
FIG. 7 illustrates an example graph consistent with the embodiments of the present disclosure.

FIG. 7 illustrates an example graph consistent with the embodiments of the present disclosure. As illustrated in FIG. 7, the graph consists of simple loops (dashed lines) each having 3 vertices. These 3-vertices-loops are connected by extra edges (solid lines) into a single, connected component. Two kinds of moves are available for a robot on the graph: a cyclic move allows a group of 3 robots to cyclically permute locations along a 3-vertices-loop (arced arrows); and a vacant move allows a robot to move along any thin edge $e \in \varepsilon$ connecting $x_i$ and $x_j$, as long as $x_j$ is not occupied by any other robot (a vacant vertex shown as a hollow circle in the figure).

In an example embodiment, a mesh discretizing $\mathcal{W}$ can be mapped to a graph embedded in $\mathcal{W}$. The mesh is denoted as $\bar{\mathcal{G}} = \langle \bar{\mathcal{X}}, \bar{\varepsilon} \rangle$. The mesh can be considered as a graph that is also a simplicial-complex, cell-decomposition of $\mathcal{W}$. As used herein, variables defined on the mesh are denoted using a bar over such variables. The mapping/conversion from a mesh $\bar{\mathcal{G}}$ into a graph $\mathcal{G}$, denoted as $\varphi(\bar{\mathcal{G}}) = \mathcal{G}$, may be performed based on the algorithm shown in Table 1.

TABLE 1 algorithm for evaluating $\Phi(\bar{\mathcal{G}})$

| 1 | X ← ∅ and ε ← ∅ |
| 2 | For Each triangular cell in $\bar{\mathcal{G}}$ do |
| 3 | For Corner point $x_{1,2,3}$ in the cell do |
| 4 | X ← X U {$x_i$} |
| 5 | For e between two points in $x_{1,2,3}$ do |
| 6 | ε ← ε U{e} |
| 7 | For e between neighboring corner points sharing edge in $\bar{\mathcal{G}}$ do |
| 8 | ε ← ε U {e} |
| 9 | $\mathcal{G} = \langle X, \varepsilon \rangle$ |
| 10 | For Corner points x of invalid cell do |
| 11 | Remove x from $\mathcal{G}$ |
| 12 | Return $\mathcal{G}$ |

Table 1 describes an algorithm of mapping from a mesh discretizing $\mathcal{W}$ to a graph embedded in $\mathcal{W}$. With references to FIGS. 6A-6C and according to Table 1, robots are first placed on inner corner points of each cell, i.e., points inside a cell that are distance-r away from two consecutive edges of the cell, such as the circles with radius r shown in FIG. 6B. Next, it is assumed that 3 robots inside the same cell form a loop, along which cyclic moves can be performed, and 3 loop edges are added to $\mathcal{G}$. Inter-cell edges are then added to $\mathcal{G}$ between the two pairs of corner points sharing an edge $\bar{e}$ in $\bar{\mathcal{G}}$. For example, in FIG. 6C, loop edges are shown as dashed lines, and inter-cell edges between neighboring cells are shown as solid lines. The inter-cell edges are edges along which vacant move can be performed. Note that some cells may be too small, and robots placed on inner corners are not collision-free. Even when corner points are collision-free, robots inside the same cell can still collide when performing cyclic moves. Accordingly, additional step is performed to remove from $\mathcal{G}$ all the corner points (and incident edges) in invalid cells. Here, an invalid cell refers to a cell with 3 corner points or cyclic moves are not collision-free.

It can be understood that the mapping/conversion process described below can be used to implement step S408. For example, step S408 may include: in for each triangular cell in the target mesh, adding three corner points on inner corners of the triangular cell to the graph as vertices, each corner point located at a point away from two consecutive edges of the triangular cell by a distance r, the distance r equaling a radius of an agent represented by the vertex; and adding edges that connect every pair of the three corner points to the graph as loop edges, a loop edge being a path along which a cyclic move can be performed by an agent inside the same cell. Step S408 may further include: adding inter-cell edges between two pairs of corner points sharing an edge in the target mesh to the graph, an inter-cell edge being a path along which a vacant move can be performed by an agent across two cells; and removing, from the graph, vertices of an invalid cell, the invalid cell being a cell where the three corner points or the cyclic move performed on loop edges are not collision-free.

The geometric properties of $\mathcal{G}$ that allows robots to move in a collision-free manner within a $\mathcal{W}$ is discussed below. The collision-free conditions of $\mathcal{G}$ can be converted to three differentiable geometric constraints on $\bar{\mathcal{G}}$. Three collision-free conditions are discussed below.

Figures 8A, 8B, 8C:
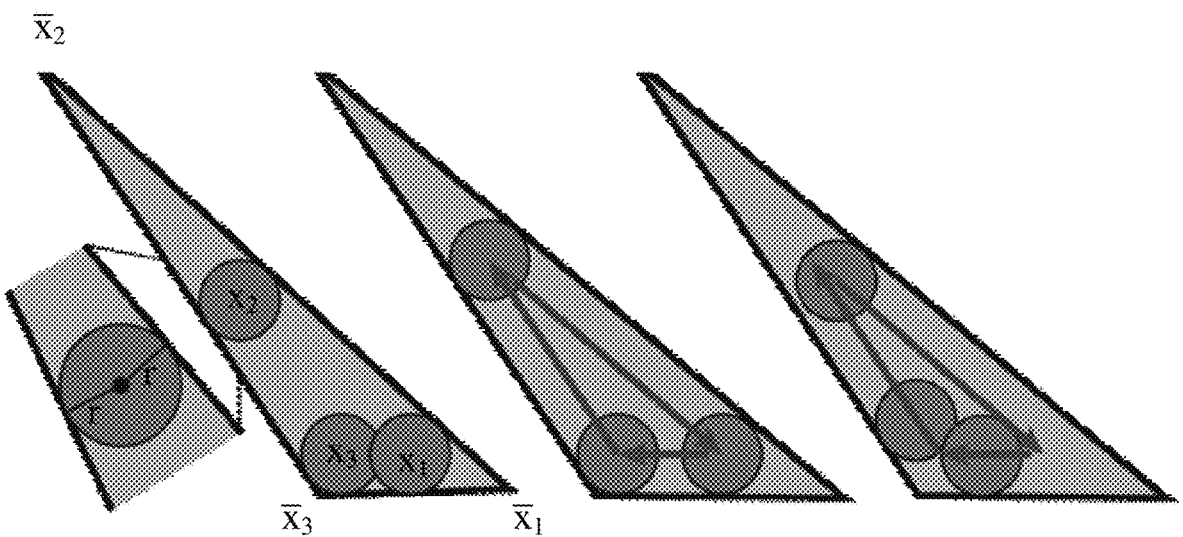
FIGS. 8A, 8B, and 8C illustrate examples of invalid cells consistent with certain embodiments of the present disclosure.

Referring to FIG. 8A, the first collision-free condition is related to planner embedding. Since $\bar{\mathcal{G}}$ is a simplicial complex, each cell is a triangle and the 3 vertices of this triangle are denoted as: $\bar{x}_1$, $\bar{x}_2$, and $\bar{x}_3$ respectively, or denoted as $\bar{x}_{1,2,3}$ for ease of description. The distance-r corner points can be computed using equation (1):

$$x_2 = \bar{x}_2 + r \frac{(\bar{x}_3 - \bar{x}_2)\|\bar{x}_1 - \bar{x}_2\| + (\bar{x}_1 - \bar{x}_2)\|\bar{x}_3 - \bar{x}_2\|}{\|(\bar{x}_3 - \bar{x}_2) \times (\bar{x}_1 - \bar{x}_2)\|} \qquad (1)$$

Here, only formula for $x_2$ is shown as an example, and it can be understood that equations for calculating $x_1$ and $x_3$ are symmetric to equation (1). A cell is marked invalid and the 3 vertices are removed from $\mathcal{G}$ if there is an overlapping between $C(x_{1,2,3})$, that is, an overlapping between circular regions having radius r and center points at $x_1$, $x_2$, and $x_3$. For example, as shown in FIG. 8A, for a thin triangle, circular regions of corner points $x_1$ and $x_3$ overlaps with each other, violating the first collision-free condition.

Referring to FIGS. 8B and 8C, the second collision-free condition is related to cyclic moves. Even when the 3 corner points are not overlapping as shown in FIG. 8B, robots can still collide when they perform cyclic moves along the 3 loop edges with constant speed, as shown in FIG. 8C. To derive a condition for collision-free cyclic moves, it is assumed that the 3 robots trace out a trajectory $\tau_{1,2,3}(t)$ where $t \in [0,1]$. At time t, the 3 robots are at positions:

$$x_{1,2,3}(t) \triangleq x_{1,2,3}(1-t) + x_{2,3,1}(t)$$

Collision-free cyclic moves satisfy equation (2):

$$\|x_{1,2,3}(t) - x_{2,3,1}(t)\| \geq 2r \, \forall t \in [0,1] \qquad (2)$$

Here, cyclic subscripts are used to denote 3 symmetric conditions. It can be understood that equation (2) is a summarized version of the 3 symmetric conditions. The left-hand side of equation (2) is quadratic when squared and determining the smallest value of a quadratic equation in

[0,1] has closed-form solution, which can be used for determining whether a cell is invalid in the algorithm shown in Table 1.

In addition to determining the validity of a cell, the disclosed mesh optimization process in accordance with step S406 may require an operator that can modify a geometric shape of an invalid cell to achieve validity using numerical optimization. To this end, a condition equivalent to equation (2) but does not contain continuous time variable t is derived, as the variable t can take infinitely many values from [0,1] leading to a difficult semi-infinite programming problem. Taking one of the equations $|x_1(t)-x_2(t)| \geq 2r$ in equation (2) for example (the other 2 cases are symmetric), its left-hand-side is a polynomial of a single time variable t. To eliminate t, the Fekete, Markov-Lukaćz theorem can be applied to show that, if equation (2) holds, then:

$$\|x_1(t) - x_2(t)\|^2 - 4r^2 =$$

$$\alpha_1(2t-1)^2 + 2\alpha_2(2t-1) + \alpha_3 + \alpha_4(4t - 4t^2) \wedge \begin{pmatrix} \alpha_1 & \alpha_2 \\ \alpha_2 & \alpha_3 \end{pmatrix} \geq 0 \wedge \alpha_4 \geq 0$$

where $\alpha_{1,2,3,4}$ are four unknown variables to be fitted. The 2×2 PSD-cone constraint is equivalent to two quadratic constraints: $\alpha_1\alpha_3 \geq 0$ and $\alpha_1\alpha_3 \geq \alpha_2^2$. By equating coefficients in the quadratic constraints, $\alpha_{1,2,3,4}$ can be expressed in terms of $x_{1,2,3}$ to get an equivalent form as the following equation (3)

$$\left(\frac{1}{4}\|2x_2 - x_1 - x_3\|^2 + \alpha_4\right)\left(\frac{1}{4}\|x_1 - x_3\|^2 - 4r^2 - \alpha_4\right) \geq \qquad (3)$$

$$\left[\frac{1}{4}(x_1 - x_3)(2x_2 - x_1 - x_3)\right]^2 \wedge \alpha_4 \geq 0$$

where $\alpha_4$ is an additional decision variable that cannot be eliminated. Now, the collision-free condition is to satisfy equation (3) for a single $\alpha_4$.

The third collision-free condition is related to vacant moves. The description below shows that, as long as the second condition related to cyclic moves is satisfied, the vacant moves are also collision-free, that is, the third condition is also satisfied. The third condition requires that a robot can move to a vacant position along any e∈ε. Two cases are analyzed below: e being a loop edge or e being an inter-cell edge.

Figure 9:
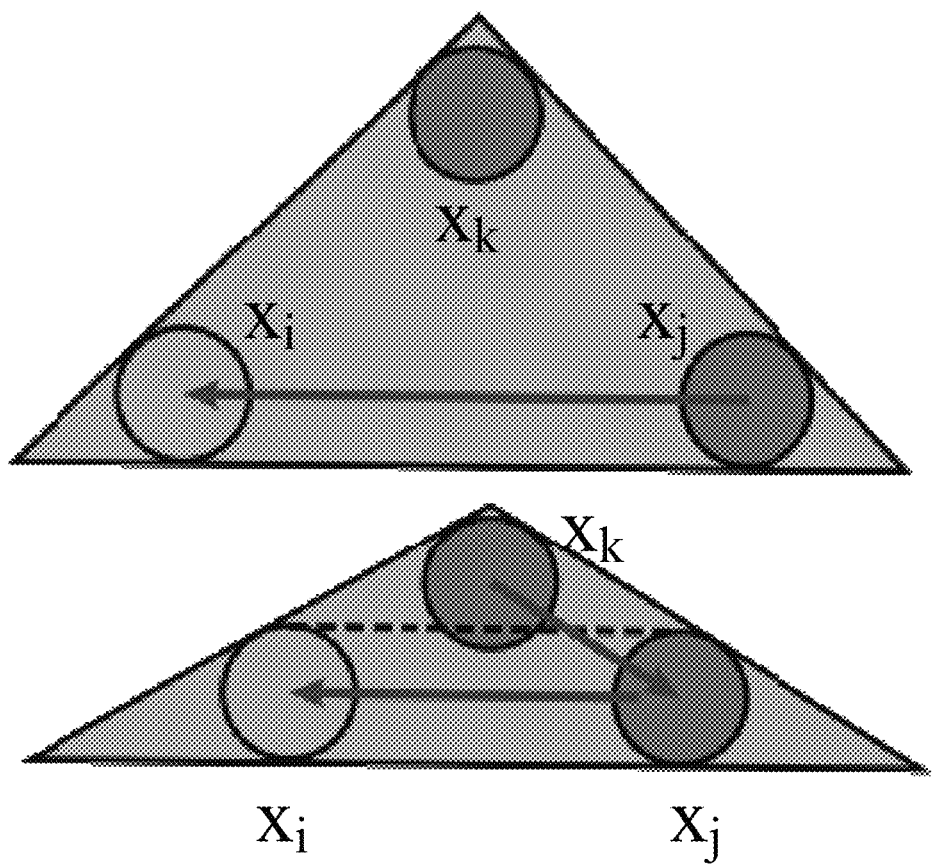
FIG. 9 illustrates collision situation of a vacant move along a loop edge consistent with certain embodiments of the present disclosure.

For the case of e being a loop edge, if one of the 3 corner points $x_i$ in a cell is vacant and another robot $x_j$ is moving along a loop edge to $x_i$, this move is always collision-free. This notion can be proved by contradiction. Referring to FIG. 9, in the top triangle, the path between $x_i$ and $x_j$ is not blocked by $x_k$. In the bottom triangle, if $x_k$ is below the dashed line and blocking the path, then the cyclic moves from $x_k$ to $x_j$ and from $x_j$ to $x_i$ along the arrows are not collision-free. That is, if this move is not collision-free, then the third corner point $x_k$ must be in the way between $x_i$ and $x_j$. However, in this case, cyclic moves in the cell are not collision-free, which contradicts the second condition. Thus, when e is a loop edge and the second condition is satisfied (i.e., the cyclic move is collision-free), then the third condition (i.e., vacant move on the loop edge is collision-free) is always satisfied.

For the case of e being an inter-cell edge, if two neighboring triangles satisfy the second condition and share an edge $\overline{e} \in \overline{\varepsilon}$, then cyclic moves inside each triangle are collision-free. As illustrated in FIG. 10A, moving $x_i$ to vacant $x_j$ along a straight line can interfere with other triangles (area 1002) in obtuse angles. As shown in FIGS. 10B-10D, if robot $x_i$ is to be moved to a vacant position $x_j$ along an inter-cell edge (illustrated by an arrow in FIG. 10B), then $x_i$ (along with the two other robots) can be rotated clockwise and $x_j$ can be rotated counterclockwise (as shown in FIG. 10C) until the line-segment $x_i$-$x_j$ is orthogonal to $\overline{e}$ (as shown in FIG. 10D) and the convex hull of $C(x_i)$ and $C(x_j)$ does not contain other robots so the vacant move is collision-free. It can be proved that such convex hull always exists between any pair of valid triangles. Further, $x_i$ and $x_j$ can be rotated reversely to undo extra changes, as shown in FIG. 10E.

In view of the above, the collision-free condition for valid cells is summarized below: A cell in $\bar{\mathcal{G}}$ is valid if its 3 corner points, computed according to equation (1), satisfy equation (2) for all $t \in [0,1]$ or satisfy equation (4) for any positive $\alpha_4$.

The following description provides embodiments of mesh optimization process discussed in step S406. The mesh optimization process is directed to search for $\bar{\mathcal{G}}$ that maximizes a user given metric $\mathcal{M}(\bar{\mathcal{G}}, \mathcal{G})$. Afterwards, a corresponding $\mathcal{G}$ can be extracted using the algorithm shown in Table 1 to solve discrete MPP problems.

In some embodiments, the metrics for evaluating candidate meshed obtained during the mesh optimization process can include at least one of the following 4 terms, $\mathcal{M}_{\#r}$, $\mathcal{M}_{\#rc}$, $\mathcal{M}_{sd}$, and $\mathcal{M}_g$. These terms can either be a function of the mesh $\bar{\mathcal{G}}$ or the graph $\mathcal{G}$. These four terms measure the robot packing density as well as the area covered by the robots in $\mathcal{W}$. $\mathcal{M}_{\#r}$ is defined as:

$$\mathcal{M}_{\#r}(\mathcal{G}) \triangleq |X|,$$

which is the number of vertices contained in $\mathcal{G}$. This term reflects the number of robots that $\mathcal{G}$ can hold, but discrete MPP problems might not be feasible for all these robots because $\mathcal{G}$ might not be connected. $\mathcal{M}_{\#r}$ is a heuristic that guides the mesh optimization process to find more valid cells at an early stage and then try to connect them.

$\mathcal{M}_{\#rc}$ is the number of robots in the largest connected component of $\mathcal{G}$:

$$\mathcal{M}_{\#rc}(\mathcal{G}) \triangleq \max_{\mathcal{G}' \subseteq \mathcal{G}_{connected}} (\mathcal{M}_{\#r}(\mathcal{G}'))$$

which is the maximal number of robots for which discrete MPP problems are feasible. Note that $\mathcal{M}_{\#r}$ and $\mathcal{M}_{\#rc}$ are discrete, non-differentiable terms that are related to both the topology and geometry of $\bar{\mathcal{G}}$. The shape of triangles in $\bar{\mathcal{G}}$ can be updated to increase $\mathcal{M}_{\#r}$ and $\mathcal{M}_{\#rc}$, and also the connectivity of triangles also can be updated so that they are valid.

$\mathcal{M}_{sd}$ denotes the robot packing density averaged over valid cells in the mesh:

$$\mathcal{M}_{sd}(\mathcal{G}) \triangleq \frac{\pi r^2 \mathcal{M}_{\#r}(\mathcal{G})}{\sum_{valid\ cell\ in\ \bar{\mathcal{G}}} |cell|}$$

$\mathcal{M}_{sd}$ is a heuristic guidance term that biases the mesh optimization process towards denser robot packing, when only a subset of the workspace is covered by the robot. |cell| denotes an area of the cell.

$\mathcal{M}_g$ is the 2D AMIPS energy using the smallest regular triangle satisfying the second condition (e.g., equation (3)) as the target shape. $\mathcal{M}_g$ is differentiable, purely geometric, and related to $\bar{\mathcal{G}}$ only.

TABLE 2 optimize $\mathcal{M}$ with respect to $\bar{\mathcal{G}}$

1  Input: Initial $\bar{\mathcal{G}}$
2  Compute $\mathcal{M} \leftarrow \mathcal{M}(\bar{\mathcal{G}}, \Phi(\bar{\mathcal{G}}))$
3  Set terminate ← False
4  For pass ← 1, 2 do
5  While Not terminate do
6  Set terminate ← True
7  Perform Collapsing, Splitting (if pass = 1), Flipping, Smoothing, LocalOpt, and GlobalOpt sequentially
8  If any operations above improve $\mathcal{M}_{\#r} + w\mathcal{M}_{\#rc}$ then
9  Set terminate ← False
10 Return $\Phi(\bar{\mathcal{G}})$ Table 2 shows a mesh optimization process consistent with certain embodiments of the present disclosure. At least one re-meshing operator of a re-meshing operator group is used in the mesh optimization process, the re-meshing operator group including an edge-flip operator, an edge-split operator, an edge-collapse operator, a vertex-smoothing operator, a local-optimization operator, and a global-optimization operator. In some embodiments, the mesh optimization process may exhaustively try one of the re-meshing operators in the group. The re-meshing operators, except for the global optimization operator, are all local and only affect a small neighborhood of cells.

Figures 11A, 11B, 11C, 11D, 11E:
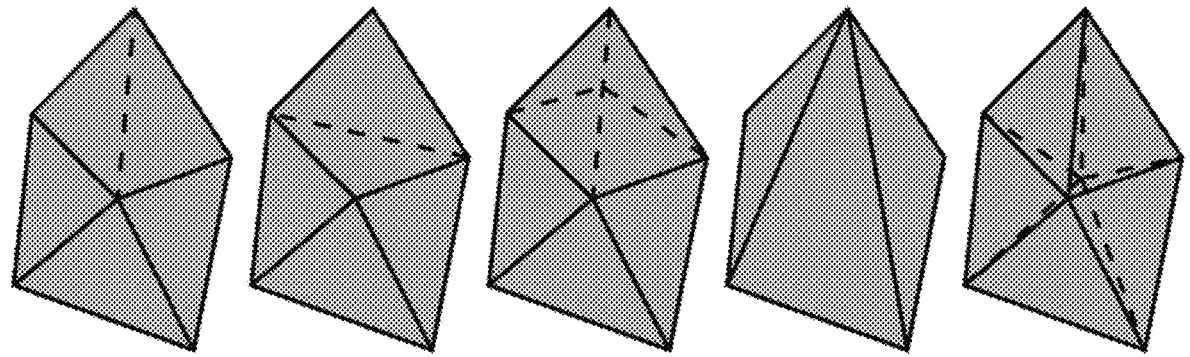
FIG. 11A-FIG. 11E illustrate re-meshing operations consistent with certain embodiments of the present disclosure.

FIG. 11A-FIG. 11E illustrate re-meshing operations of the first four re-meshing operators. FIG. 11A shows an original mesh with a dashed edge to be re-meshed. FIG. 11B shows an outcome of doing an edge-flip operation on the mesh shown in FIG. 11A. Edge-flip is guided by $\mathcal{M}_g$ and is mostly applied to obtuse triangles and turns them into acute triangles. For example, when flipping an edge can convert an obtuse triangle to an acute triangle, that is, an operation can make the outcome triangle closer to the target shape indicated by $\mathcal{M}_g$, the edge-flip is performed, otherwise, edge-flip is not performed. FIG. 11C shows an outcome of doing an edge-split operation on the mesh shown in FIG. 11A. FIG. 11D shows an outcome of doing an edge-collapse operation on the mesh shown in FIG. 11A. Edge-split and edge-collapse are used to remove tiny edges and split long edges in $\bar{\mathcal{G}}$, respectively. Allowing edge-split may create more triangles and potentially lead to denser packing of robots. In some embodiments, an edge $\bar{e}$ is split when its length is larger than n times of the optimal length $\bar{e}^*$. n can be a number greater than 1, such as 1.3. Here, the optimal length is the edge length of the smallest regular triangles satisfying the second condition, which equals to: $\bar{e}^* = (2\sqrt{3}+4)r$. FIG. 11E shows an outcome of doing a vertex-smoothing operation on the mesh shown in FIG. 11A. Vertex-smoothing locally optimizes $\mathcal{M}_g$ with respect to the one-ring neighborhood of a single vertex. For example, positions in the one-ring neighborhood of the vertex are explored to find a position that makes more cells having the vertex closer to the target shape. The four operators combined can turn a low-quality mesh into one with nice element shapes. It can be understood that the four operator themselves are common but the metrics that guides the re-meshing operations are introduced by embodiments of the present disclosure.

Embodiments of the present disclosure also introduce the local optimization operator (abbreviated as LocalOpt in Table 2) and the global-optimization operator (abbreviated as GlobalOpt in Table 2). The local-optimization operator is configured to determine positions of a plurality of vertices in a local area that maximizes a total area of valid cells in a mesh, wherein a triangle cell of a mesh is a valid cell when agents placed on three corner points of the cell and performing cyclic moves on edges of the cell are collision-free. The global-optimization operator is configured to determine positions of a plurality of vertices in the mesh that maximizes the total area of the valid cells in the mesh.

The two operators use a primal-dual interior point method to optimize the geometric shape of the cells, taking the second condition (e.g., equation (3)) as hard constraints. At the same time, $\mathcal{M}_{sd}$ can be maximized by minimizing the area of valid cells, leading to a denser robot packing. Specifically, for a cell in $\bar{\mathcal{G}}$ with vertices $\bar{x}_{1,2,3}$, the following problem can be solved in the local-optimization operator:

$$\operatorname*{argmin}_{\bar{x}_{1,2,3}} \sum_{\text{valid cell in } \bar{\mathcal{G}}} |\text{cell}| \text{ s.t.} \qquad (5)$$

$$\forall \text{ valid cell in } \bar{\mathcal{G}} \qquad \text{Eq. 3}$$

$$\forall \text{ cell in } \bar{\mathcal{G}} \qquad \text{Eq. 4}$$

where equation (4) is added for all cells since it is required that the entire mesh to be a cell decomposition, and equation (3) for all valid cells is added since it is required that those originally valid cells stay valid. This optimization can be solved efficiently when it is local. In some embodiments, 3 vertices of a single cell in $\bar{\mathcal{G}}$ are treated as decision variables, most of the terms in the objective function and constraints are outside the 1-ring neighborhood of $\bar{x}_{1,2,3}$ and not influenced by the decision variables, which can be omitted. Note that is expressed in terms of the corner points $x_{1,2,3}$, instead of mesh vertices $\bar{x}_{1,2,3}$. When the optimizer requires partial derivatives of equation (3) against $\bar{x}_{1,2,3}$, the chain rule on the relationship in equation (1) can be used.

The global-optimization operator is very similar to the local-optimization operator, which also takes the form of equation (5), but all the variables $\bar{x}$ (e.g., all vertices in the mesh) are set as decision variables. The global-optimization can be more computation expensive than all other operators, but it was found that this last operator can significantly improve robot packing density and it could be more efficient than applying the local-optimization operator to each of the cell.

It can be understood that though the process shown in Table 2 listed all six re-meshing operators in sequence, other embodiments can be implemented with some of the six re-meshing operators in another sequence for the mesh optimization.

In some embodiments, the optimization process includes performing k passes of iterations, k being a positive integer. In each pass of iterations, re-meshing operators are selected from the re-meshing operator group and are sequentially used to obtain a result mesh that improves the value of a metric function. Further, the result mesh corresponding to a pass other than kth pass is identified as a current candidate mesh to initiate a next pass of the iterations, and the result mesh corresponding to the kth pass is identified as the target mesh.

In one embodiment, each pass of iteration includes performing the following: using a current re-meshing operator of the re-meshing operators corresponding to a current pass on a current candidate mesh, to obtain a subsequent candidate mesh; determining a metric value corresponding to the subsequent candidate mesh according to the metric function; determining whether the metric value of the subsequent candidate mesh satisfies a condition related to a metric value corresponding to the current candidate mesh; when the metric value of the subsequent candidate mesh satisfies the condition, identifying the subsequent candidate mesh as the current candidate mesh and returning to the step of using the current re-meshing operator on the current candidate mesh; when the metric value of the subsequent candidate mesh does not satisfy the condition and when the current re-meshing operator is not a last operator in the re-meshing operator group, identifying a next re-meshing operator of the re-meshing operators corresponding to the current pass as the current re-meshing operator and returning to the step of using the current re-meshing operator on the current candidate mesh; when the metric value of the subsequent candidate mesh does not satisfy the condition and when the current re-meshing operator is the last operator in the re-meshing operator group, stopping the current pass of iterations and determining the current candidate mesh as the result mesh of the current pass. In some embodiments, the condition includes the metric value of the subsequent candidate mesh being greater than the metric value corresponding to the current candidate mesh. In some cases, replying just on comparison between metric values may cause the iterations stop at a local maximum. It can be understood that this process may further include other add-on condition and/or operation that guide the iterations to find a global maximum instead of a local maximum, such as Roulette wheel selection and simulated annealing.

In another embodiment, each pass of iteration includes performing the following: sequentially using the re-meshing operators corresponding to a current pass on the current candidate mesh to obtain a subsequent candidate mesh; determining a metric value corresponding to the subsequent candidate mesh according to the metric function; determining whether the metric value of the subsequent candidate mesh is greater than a metric value corresponding to the current candidate mesh; when the metric value of the subsequent candidate mesh is greater, identifying the subsequent candidate mesh as the current candidate mesh and returning to the step of sequentially using the re-meshing operators corresponding to the current pass on the current candidate mesh; and when the metric value of subsequent candidate mesh is not greater, stopping the current pass of interactions and identifying the subsequent candidate mesh as the result mesh of the current pass. It can be understood that this process may further include other add-on condition and/or operation that guide the iterations to find a global maximum instead of a local maximum, such as Roulette wheel selection and simulated annealing.

In some embodiments, when the current re-meshing operator is a local operator, using a current re-meshing operator on a current candidate mesh can include: for each edge or vertex in the current candidate mesh, determining whether to use the current re-meshing operator on the cell or the vertex according to a metric term. For example, whether to use the edge-flip operator or the edge-split operator on a certain edge, and/or whether to use the vertex-smoothing operator on a vertex, is determined according to $\mathcal{M}_g$. If an operation cannot make the corresponding cell(s) closer to a target shape corresponding to $\mathcal{M}_g$, the operator is not used.

As shown in Table 2, in one example, the optimization process uses two passes (i.e., k=2). In the first pass, the process explores a larger search space by allowing both edge-collapse and edge-split. In some embodiments, the cases where consecutive edge-flip and edge-split operators happen for a same edge repeatedly are avoided to ensure the convergence of the first pass. The second pass is more conservative than the first pass and disallow edge-split. The second pass can be considered as post-processing, merging too small triangles and simplifying the robot layout. Within each pass, every possible operator is checked, and operators can be accepted when the weighted metric $\mathcal{M}_{\#r} + \omega \mathcal{M}_{\#rc}$ monotonically increases. In one example, w=10. Operators that violate assumption on $\bar{\mathcal{G}}$ being a cell decomposition, i.e., operators introducing non-manifold connection and flipped cells, may also be rejected. The non-manifoldness of $\bar{\mathcal{G}}$ can happen only in edge-collapse and can be avoided by a link condition check. A flipped cell has a negative area which can be checked by the following constraint: $(\bar{x}_2 - \bar{x}_1) \times (\bar{x}_3 - \bar{x}_1) \geq 0$.

With reference to step S412, the following descriptions are directed to solutions to MPP problems. MPP problems in a general setting is intractable and practical methods target at problem subclasses. Early works use RRT or PRM to solve continuous MPP problems. However, as the number of robots goes large, e.g., more than 30, RRT-like methods would incur exponentially increasing running time. When robots are restricted to move on a graph, their motions can be enumerated using CBS or integer programming. These algorithms are practical for finding optimal solutions of a small group of robots. However, CBS and its variants become intractable when the environment is highly congested. In this case, pebble-graph-based feasibility check is the only way to find sub-optimal solutions. The features of various planning algorithms that can be used on embedded graphs generated based on disclosed methods are summarized in Table 3. The CBS method in table 3 is based on Sharon, Guni, et al. "Conflict-based search for optimal multi-agent pathfinding." *Artificial Intelligence* 219 (2015): 40-66. The Divide-and-Conquer is based on Yu, Jingjin. "Average case constant factor time and distance optimal multi-robot path planning in well-connected environments." *Autonomous Robots* 44.3 (2020): 469-483.

TABLE 3 features of different discrete MPP planners

| Method | Boundary-Aligned | Highly-Congested | Optimality |
|---|---|---|---|
| CBS | N/A | No | Optimal |
| Divide-and-Conquer | No | Yes | Bounded |
| Method provided by the present disclosure | Yes | Yes | No |

Feasible solutions to discrete MPP instances are provided in the following embodiments. Some embodiments are directed to solutions for a large-scale highly congested robot swarm. The disclosed method is capable of using vacant graph vertices to schedule parallel robot motions.

Figure 12:
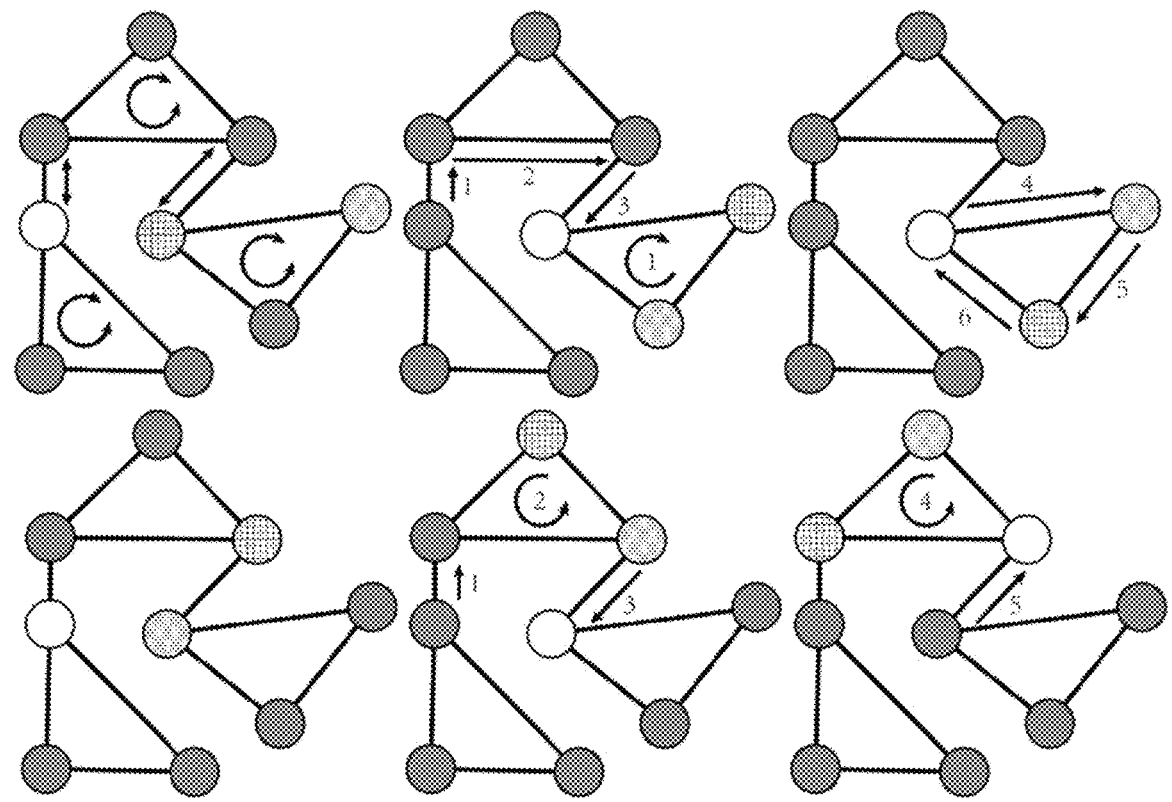
FIG. 12 illustrates sub-swap cases between two connected vertices consistent with certain embodiments of the present disclosure.

A discrete MPP problem can be solved using a series of sub-swaps between two connected vertices. FIG. 12 illustrate sub-swap cases between two connected vertices consistent with certain embodiments of the present disclosure. In FIG. 12, a white circle represents a vacant vertex; a gray circle represents a vertex whose position is expected to remain the same; a meshed vertex and a dotted vertex represent two vertices whose position should be swapped. The arrow with a number i means a move at the ith round; arrows with a same number i mean moves that can be performed at the ith round in parallel. FIG. 12 shows two cases for swapping two connected vertices. In Case I where the two vertices belong to the same loop, the vacant vertex can be moved to the loop at rounds (1,2), and the two vertices can be swapped via 3 vacant moves at rounds (4,5,6). In Case II where the two vertices belong to two connected loops, rounds (1,2,3,4) can be performed to reduce to case I. After the swaps, all other robots' position can be made unaltered using a reversed sequence of moves. It should be noted that discrete MPP instances restricted to the graph with the topology as illustrated in FIG. 12 are always feasible. In other words, if $\mathcal{G}$ has more than 1 loop, then any discrete MPP problem with $N<|\mathcal{X}|$ is feasible.

A sketch of proof is provided below. Any permutation a of robot positions can be decomposed into a set of pairwise swaps. To swap the location of two robots, $x_i$ and $x_j$, a path in $\mathcal{G}$ connecting $x_i$ and $x_j$ is first found, which is always possible since $\mathcal{G}$ is connected. The path can be denoted as $x_i, x_1, x_2, \ldots, x_K, x_j$. The swap between $x_i$ and $x_j$ can be further decomposed into a series of sub-swaps: $x_i \leftrightarrow x_1, \ldots, x_i \leftrightarrow x_K, x_i \leftrightarrow x_j, x_K \leftrightarrow x_j, \ldots, x_1 \leftrightarrow x_j$. Here, each pair of positions in a sub-swap are connected directly by some $e \in \varepsilon$, where e is either a loop edge or an inter-cell edge. In either case, the sub-swap can be performed with the help of a nearby vacant vertex as illustrated in FIG. 12. Further, such vacant vertex must exist because the number of robots is strictly less than the number of vertices and the vacant position can be moved anywhere via vacant moves. In other words, discrete MPP problems are feasible on the graphs generated based on the disclosed approach, as long as the number of robots is less than $|\mathcal{X}|$.

The quality of a discrete MPP solution can be measured via makespan, which is the number of timesteps used by the entire scheduling process, where each timestep involves one or more robots moving simultaneously. In the worst case, the makespan of above mentioned discrete MPP solutions is $O(|\mathcal{X}|^2)$. The worst case may occur when there is only one vacant vertex in the graph, which is needed to perform every sub-swap. When more vacant vertices are available, the sub-swaps can be performed in parallel and the makespan can be improved. In some embodiments, a space-time search algorithm can be performed to find parallel sub-swaps. In some embodiments, a length of the timestep is determined by the longest edge in the graph.

Figure 13:
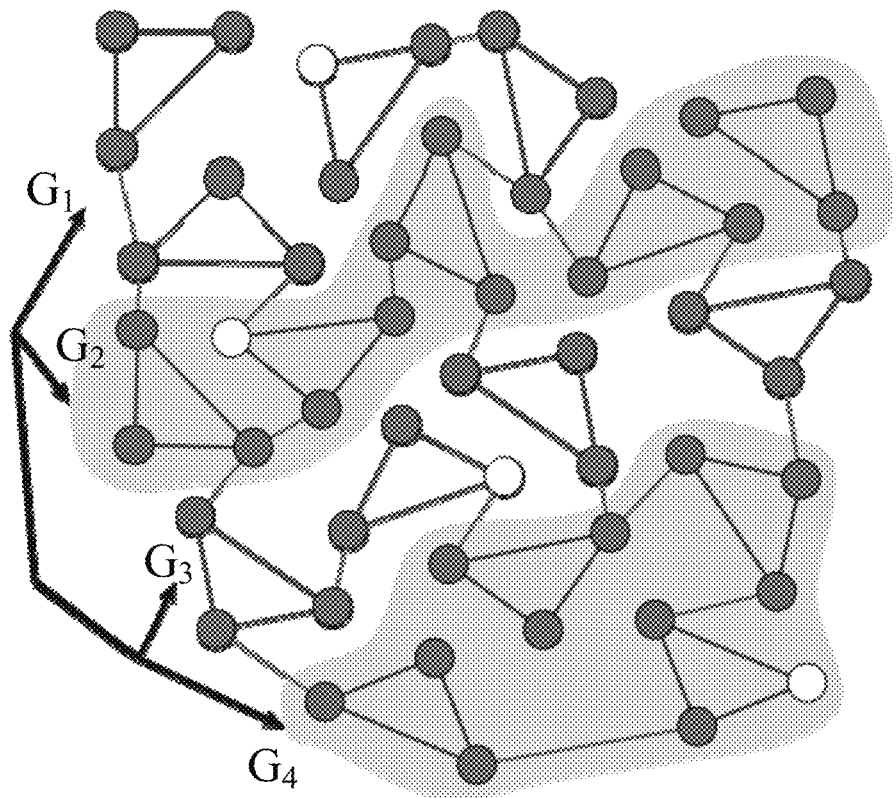
FIG. 13 illustrates generating an example binary tree based on a graph consistent with certain embodiments of the present disclosure.
Figure 14A:
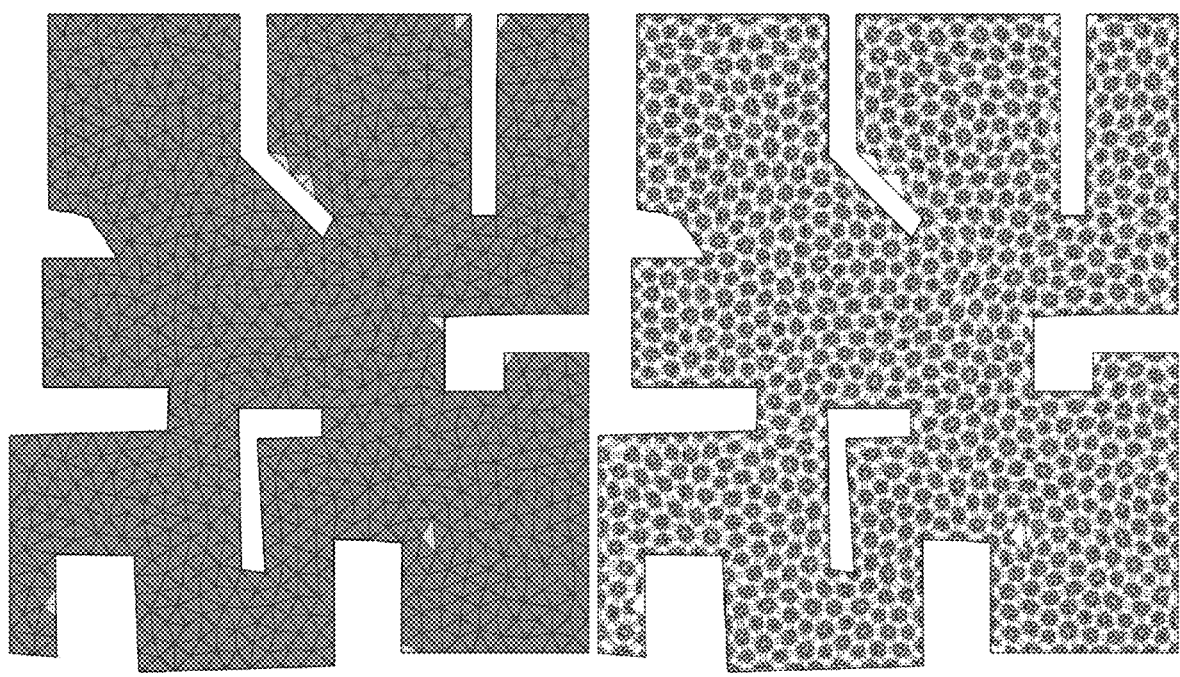
FIG. 14A-FIG. 14F illustrate example results of mesh discretization and graph embedding from experiments conducted consistent with certain embodiments of the present disclosure.
Figure 14B:
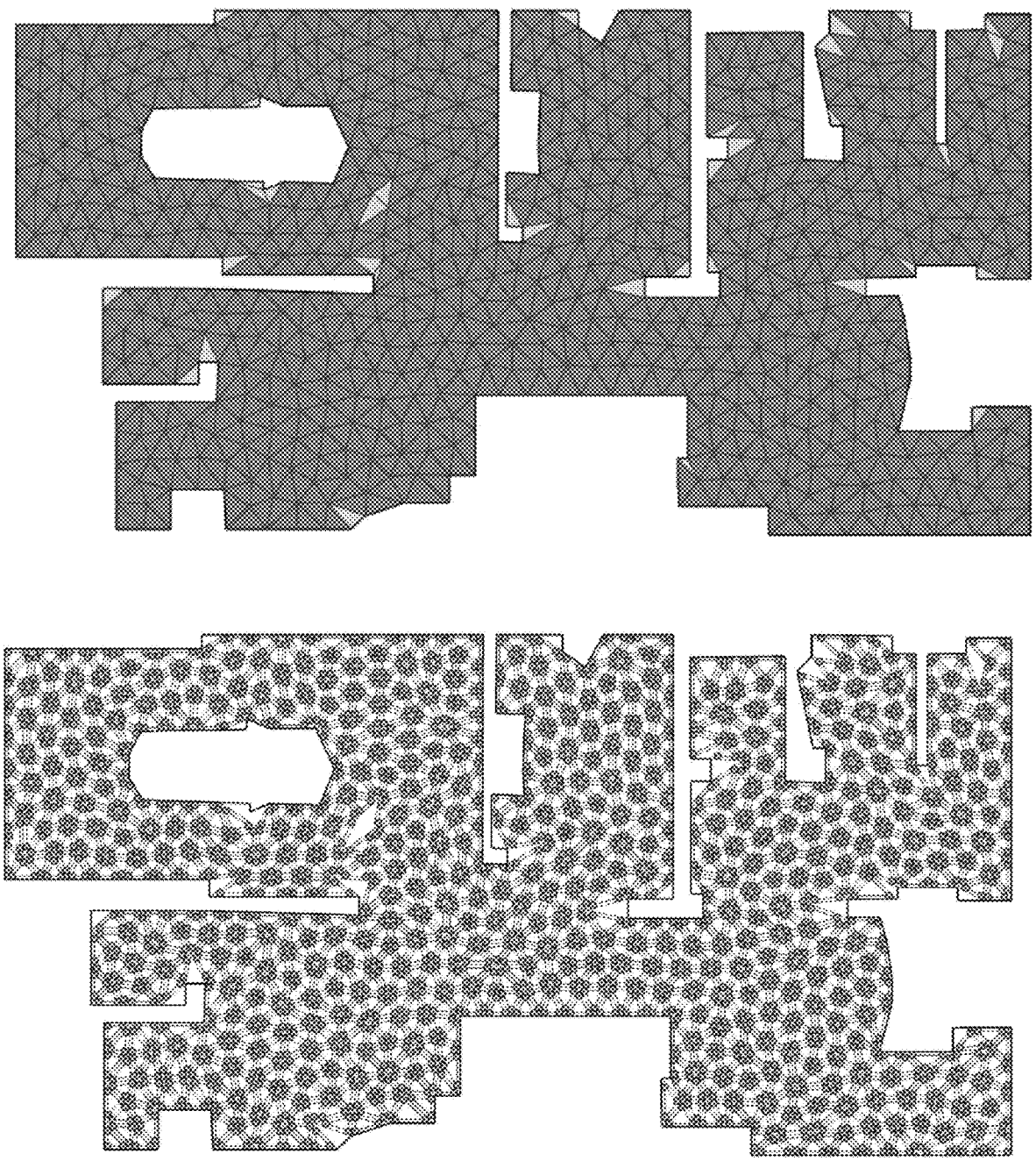
Figure 14C:
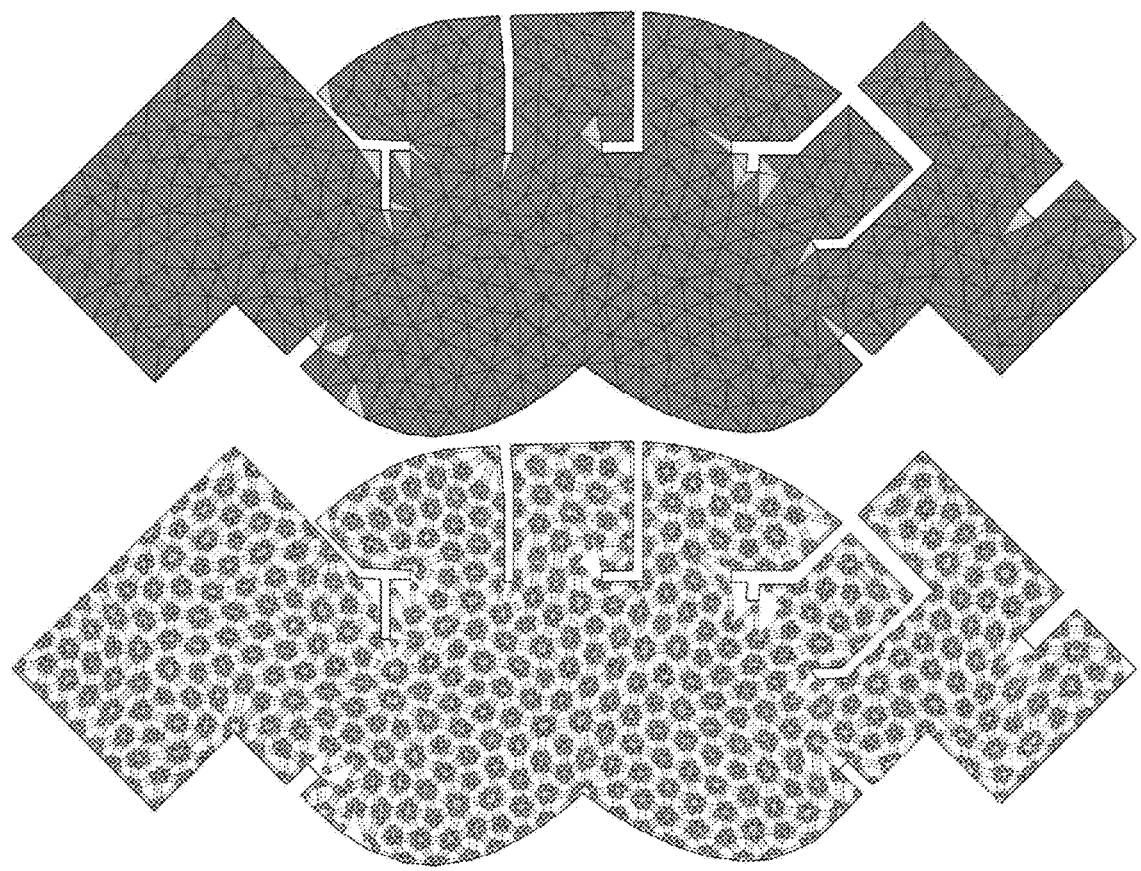
Figure 14D:
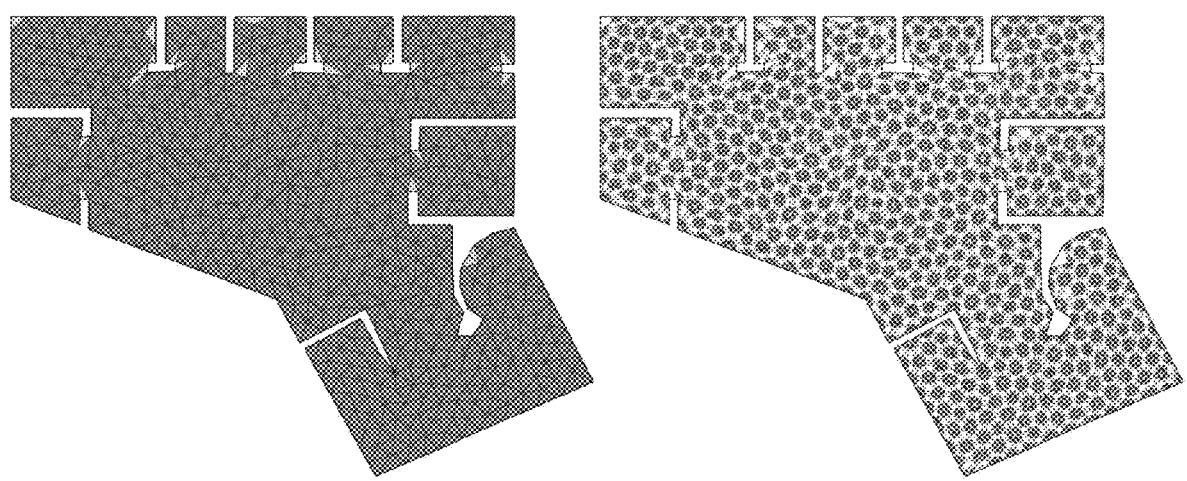
Figure 14E:
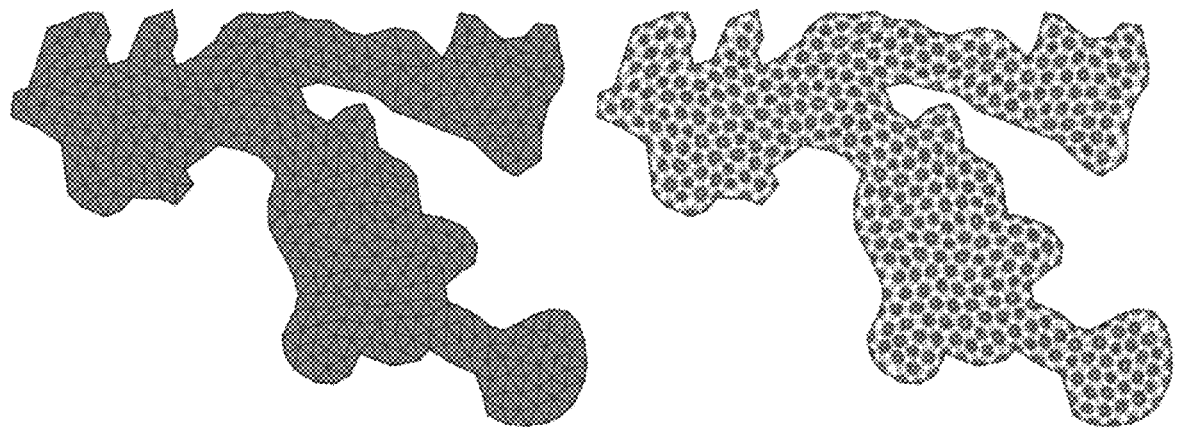
Figure 14F:
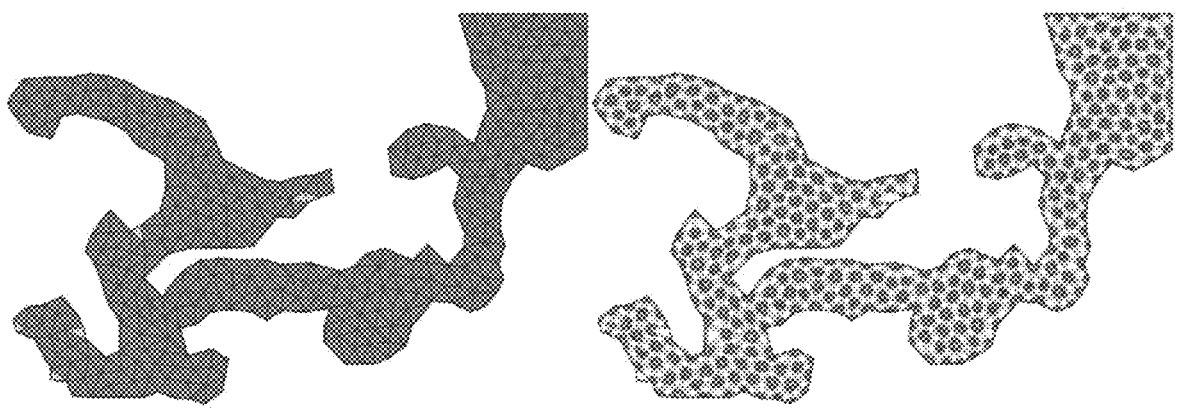

In some embodiments, planning the paths for the plurality of agents can include identifying a plurality of sub-graphs in the target graph, each sub-graph including at least one vacant vertex and being connected with a neighboring sub-graph by an inter-cell edge; and recursively swapping, according to the origins and destinations of the agents, a plurality of agents between two sub-graphs until $x_i$ and $x_{o(i)}$ belongs to the same sub-graph for all i=1, . . . , N, wherein $x_i$ denotes an origin of an ith agent, a denotes a position permutation, and $x_{o(i)}$ denotes a destination of the ith agent. For example, the sub-graphs can be identified according to a binary tree generated by clustering loops in the graph. In some embodiments, the binary tree may be generated by using, for example, a CLINK algorithm. The tree generation process starts by treating each loop as a separate cluster (e.g., a leaf node), and then iteratively merge two smallest clusters (e.g., with the smallest number of vertices, the two clusters being child nodes of the node corresponding to the cluster after merging) until only one cluster is left. The process then goes on to iteratively merge small leaf nodes until all leaf nodes have more than K>1 loops, where K is a user specified parameter determining the congestion-level. In a worst case, this method requires $\lceil |\mathcal{X}|/(3K) \rceil$ vertices to be left vacant. Further, each leaf node should include at least one vacant vertex. For example, for a loop cluster (sub-graph) that does not contain a vacant vertex, other loop having a vacant vertex and connected to any loop in the loop cluster can be included to be produce a sub-graph qualifying as a leaf node. FIG. 13 illustrates generating an example binary tree based on a graph consistent with certain embodiments of the present disclosure. The graph is divided into 4 sub-graphs (clusters), each sub-graph includes at least 4 loops and one vacant vertex. The corresponding binary tree has four leaf nodes, G1-G4. The nodes at height 1 are a parent node of G1 and G2 corresponding to a sub-graph containing both G1 and G2, and a parent node of G3 and G4, these two parent nodes are child nodes of the root node corresponding to the whole graph. Since each sub-graph corresponding to a leaf-node includes at least one vacant vertex, cyclic moves and vacant moves can be performed parallelly within a leaf node and two pairs of connected leaf nodes can perform two robot position swaps in parallel.

In addition, a divide-and-conquer process can be used. For every internal binary tree node, its two children, which are two connected sub-graphs, are considered. Robots between the two sub-graphs are swapped until $x_i$ and $x_{o(i)}$ belongs to the same sub-graph for all i=1, . . . , N. This procedure is performed recursively from the root node to all leave nodes, where the swaps within different sub-trees are performed in parallel.

The scheduling of parallel robot position swaps between sub-graphs can be performed using a space-time data structure. Here, $\mathcal{G}_i$ denotes the ith leaf node and it is assumed that there are $N_1$ leaf nodes in one of the sub-graphs and $N_2$ in the other sub-graph, where $N_1+N_2 \leq \lceil |\mathcal{X}|/(3K) \rceil$. The inter-sub-graph position swaps are decomposed into several rounds, where each round consists of several parallel position swaps between two connected leaf nodes. $\mathcal{G}_{i,t}$ is used to denote the state of $\mathcal{G}_i$ at the beginning of tth round. $\mathcal{G}_{i,t}$ and $\mathcal{G}_{j,t+1}$ can be connected using a space-time edge $e_{ij,t}$ if two conditions hold: 1) $\mathcal{G}_i$ and $\mathcal{G}_j$ are connected by some inter-loop edge $e \in \varepsilon$; 2) $\mathcal{G}_i$ and $\mathcal{G}_j$ belong to the same sub-graph, i.e., $i,j \leq N_1$ or $N_1 < i,j \leq N_1+N_2$. The space-time data structure is defined as the space-time graph $\langle \{\mathcal{G}_{i,t} | t \leq t_0+1\}, \{e_{ij,t} | t \leq t_0\} \rangle$, where $t_0$ is the maximal allowed number of rounds (i.e., timesteps). Note that the space-time graph is directed with each $e_{ij,t}$ directing from $e_{j,t+1}$ to $e_{i,t}$. The inter-sub-graph position swaps can be accomplished by multi-rounds of swaps between leaf nodes, which in turn corresponds to selecting a set of space-time edges $e_{ij,t}$. The path planning algorithm can greedily select a set of space-time edges leading to an inter-sub-graph position swap in the earliest round. After each selection, conflicting space-time edges are removed before selecting the next set of edges, until all the robots belong to the correct sub-graph. When no position swaps can be found for the given $t_0$, a new round is introduced and $t_0$ is increased by one. This procedure is guaranteed to terminate.

TABLE 4

Space-Time scheduling of robot swaps

| | |
|---|---|
| 1 | Input: Sub-graphs A: leaves $G_{1,...,N_1}$ and $G_{N_1+1,...,N_1+N_2}$ |
| 2 | $t_0 \leftarrow 2$ |
| 3 | Build space-time graph $\langle \{\mathcal{G}_{i,t} \mid t \leq t_0 + 1\}, \{e_{ij,t} \mid t \leq t_0\} \rangle$ |
| 4 | While $\Sigma_{i=1,...,N_1+N_2} \# \mathcal{G}_{i,t_0} > 0$ do |
| 5 |   Found ← False |
| 6 |   For t = 1, ... , $t_0$ do |
| 7 |     For connected leaf nodes $\mathcal{G}_a, \mathcal{G}_b$ do |
| 8 |       Run Dijkstra's algorithm from $\mathcal{G}_{a,t}, \mathcal{G}_{b,t}$ |
| 9 |       Until some $\mathcal{G}_{i,t}$ satisfying equation 6 is found |
| 10 |       If Found both shortest paths then |
| 11 |         Select edges on the two shortest paths |
| 12 |         for Selected edge $e_{ij,t}$ do |
| 13 |           Remove $\{e_{kj,t}, e_{ik,t}\}$ |
| 14 |           For t' = 1, ... , $t_0$ do |
| 15 |             Remove $\left\{ e_{ki,t'}, e_{kj,t'} \mid \min_{t''=t',...,t_0} \#/\mathcal{G}_{j,t''} = 0 \right\}$ |
| 16 |         Remove $\{e_{ak,t}, e_{bk,t}\}$ |
| 17 |         Found ← Ture |
| 18 |   If Found ← False then |
| 19 |     $t_0 \leftarrow t_0 + 1$ |
| 20 |     Build space-time nodes $\mathcal{G}_{i,t_0+2}$, edges $e_{ij,t_0+1}$ |

Table 4 outlines a process for space-time scheduling of robot swaps, which is composed of two main steps. First, all pairs of connected leaf nodes $\langle \mathcal{G}_{a,t}, \mathcal{G}_{b,t} \rangle$ belonging to different sub-graphs are considered. The two shortest paths connecting from $\mathcal{G}_{a,t}, \mathcal{G}_{b,t}$ to some leaf node containing a robot that belongs to a different sub-graph. Specifically, Dijkstra's algorithm is run with all-one edge weights from both $\mathcal{G}_{a,t}$ and $\mathcal{G}_{b,t}$. The Dijkstra's algorithm can be terminated at any $\mathcal{G}_{i,t}$ satisfying the following condition (6)

$$\min_{t'=t,...,t_0} (\#\mathcal{G}_{i,t'}) > 0$$

where $\#\mathcal{G}_{i,t}$ denotes the number of robots within $\mathcal{G}_{i,t}$ that belongs to a different sub-graph from $\mathcal{G}_{i,t}$ at the beginning of the tth round. Accordingly, equation (6) ensures that swapping one more robot away from $\mathcal{G}_i$ during the tth round would not cause conflict with the number of to-be-swapped robots required by other swapping operations in the future rounds. It should be noted that nodes pairs are processed in a time-ascending order. The first pair of leaf nodes, for which such paths can be found, are selected, which corresponds to the position swap in the earliest round.

The second step includes removing three types of conflicting edges: 1) If an edge $e_{ij,t}$ is selected, then all the edges $\{e_{kj,t}, e_{ik,t} \mid k=1, \ldots, N_1+N_2\}$ are removed because they conflict with the edges along the two paths; 2) all the edges $\{e_{ak,t}, e_{bk,t} \mid k=1, \ldots, N_1+N_2\}$ are removed because they conflict with the inter-sub-graph swap between $\mathcal{G}_{a,t}, \mathcal{G}_{b,t}$; 3) provided that $\#/\mathcal{G}_{j,t}$ denotes the number of robots belonging to the same sub-graph as $\mathcal{G}_j$ at the beginning of tth round (# $\mathcal{G}_{i,t}+\#/\mathcal{G}_{j,t}$ equals the number of vertices in $\mathcal{G}_j$), then all the edges $$\left\{ e_{kj,t} \mid \min_{t'=t,...,t_0} \#/\mathcal{G}_{j,t'} = 0 \wedge k = 1, \ldots, N_1 + N_2 \right\}$$

should be removed. This is because selecting edge $e_{kj,t}$ implies that a robot $x_a \in \mathcal{G}_{k,t}$ must be swapped with another robot $x_b \in \mathcal{G}_{j,t}$ at tth round. $x_b$ should belong to the same sub-graph as $\mathcal{G}_j$ at the beginning of tth round, because otherwise the shortest path would stop at $x_b$ instead of moving on to $x_a$. In some cases, $$\min_{t'=t,...,t_0} \#/\mathcal{G}_{j,t'} = 0$$

implies that, if $x_b$ was swapped out of $\mathcal{G}_j$ during tth round, there will not be enough to-be-swapped robots (that belongs to the same sub-graph as $\mathcal{G}_j$) during some future rounds.

Experiments in accordance with embodiments of the present disclosure were conducted on a single desktop machine with Intel i7-9700 CPU. The input for each experiment was a vector image in SVG format representing $\mathcal{W}$. The vector image was manually traced in Adobe Illustrator from online PNG images of real building floor plans and maps used in games. A process based on Table 2 starts from an initial guess of $\bar{\mathcal{G}}$, which can be generated using constrained Delaunay Triangulation. The mesh optimization process then turns a triangle mesh with only a few triangles satisfying the feasibility conditions (e.g., as shown in FIG. 5A), into a regular triangle mesh, with conditions satisfied for most triangles (e.g., as shown in FIG. 5B).

Figure 15A:
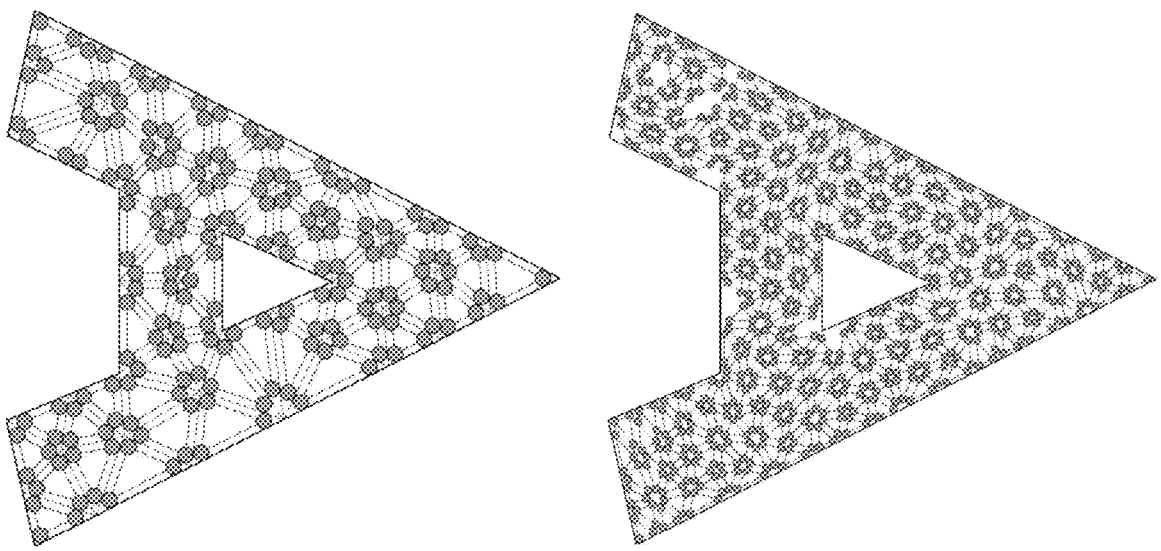
FIGS. 15A and 15B illustrate example results of graph embedding with varying robot sizes from experiments conducted consistent with certain embodiments of the present disclosure.
Figure 15B:
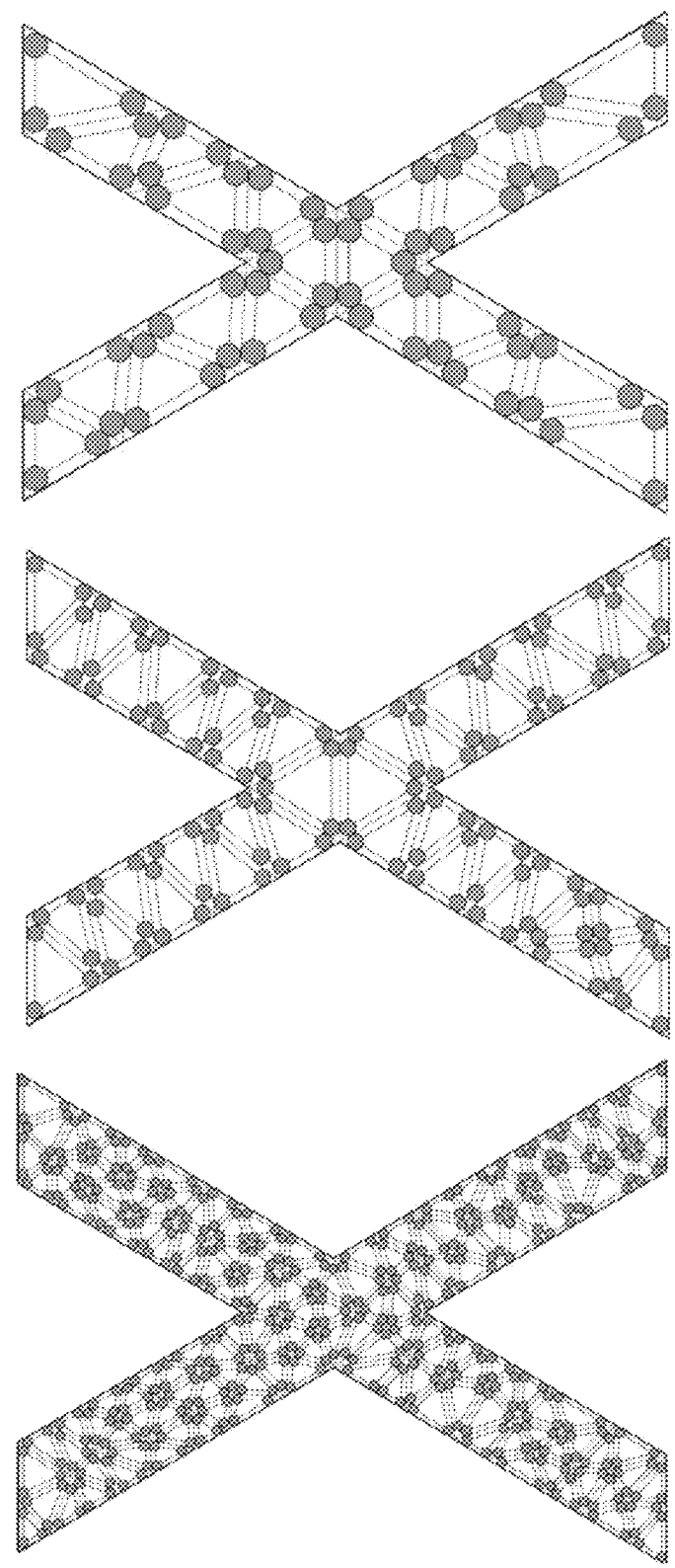

The algorithm based on Tables 1-2 were evaluated on a set of complex workspaces as shown in FIGS. 14A-14F, FIG. 15A, and FIG. 15B and summarized statistics including: $\mathcal{M}_{\#r}$, robot density D (the ratio between the area of robots and the area of $\mathcal{W}$), free space coverage (the ratio between the area of all valid cells and the area of $\mathcal{W}$), and computational time (minutes) are shown in Table 4. FIGS. 14A-14F correspond to models 1-6 in Table 4 and show optimized triangulation results and converted graphs. Invalid cells in FIGS. 14A-14F are shown in light gray. FIGS. 15A and 15B show graphs with varying robot sizes. The graphs shown in FIG. 15A, from left to right, correspond to models 7-8 in Table 4. The graphs shown in FIG. 15B, from top to bottom, correspond to models 9-11 in Table 4. Note that, since $\mathcal{M}_{\#r}$, $\mathcal{M}_{\#rc}$ are the same for all the tested examples in these figures, only results of $\mathcal{M}_{\#r}$ are listed here. While the disclosed graph embedding may not be able to support real-time computation for large environments, for a given size robot and environment, computation is only needed once and it can support repeated discrete MPP queries.

TABLE 4

Statistics of $\mathcal{M}_{\#r}$, robot density D, free space coverage, and computational time
(minutes) for the graph generation shown in FIGS. 14A-14F, FIGS.15A, and FIG. 15B

| Measures/Models | 1 | 2 | 3 | 4 | 5 | 6 | 7 | 8 | 9 | 10 | 11 |
|---|---|---|---|---|---|---|---|---|---|---|---|
|  | 1489 | 1061 | 782 | 1021 | 756 | 569 | 60 | 257 | 22 | 40 | 150 |
| D1 ↑ | 0.31 | 0.29 | 0.30 | 0.30 | 0.29 | 0.28 | 0.28 | 0.30 | 0.24 | 0.19 | 0.26 |
| Coverage ↑ | 1.00 | 0.98 | 0.98 | 0.98 | 1.00 | 0.99 | 1.00 | 1.00 | 1.00 | 1.00 | 1.00 |
| time (min) ↓ | 236 | 43 | 74 | 98 | 47 | 54 | 0.55 | 4.35 | 0.10 | 0.20 | 0.77 |

Results based on the disclosed method were compared with the regular-pattern baseline, as shown in FIGS. 1A-1D. The generated graph embedding shown in FIG. 1B and FIG. 1D not only align well with curved input boundaries but also has high free-space coverage ratio of 99.0% and robot density ratio of 30.3% on average. The disclosed method exhibits at least three benefits: 1) boundary alignment, while the regular pattern method introduces undesirable zig-zag boundary coverage; 2) full coverage of the workspace, while prior works leaves large spaces near the boundary; and 3) captures narrow passages that can be missed by regular tiling patterns, leading to infeasible discrete MPP problems.

Figure 16:
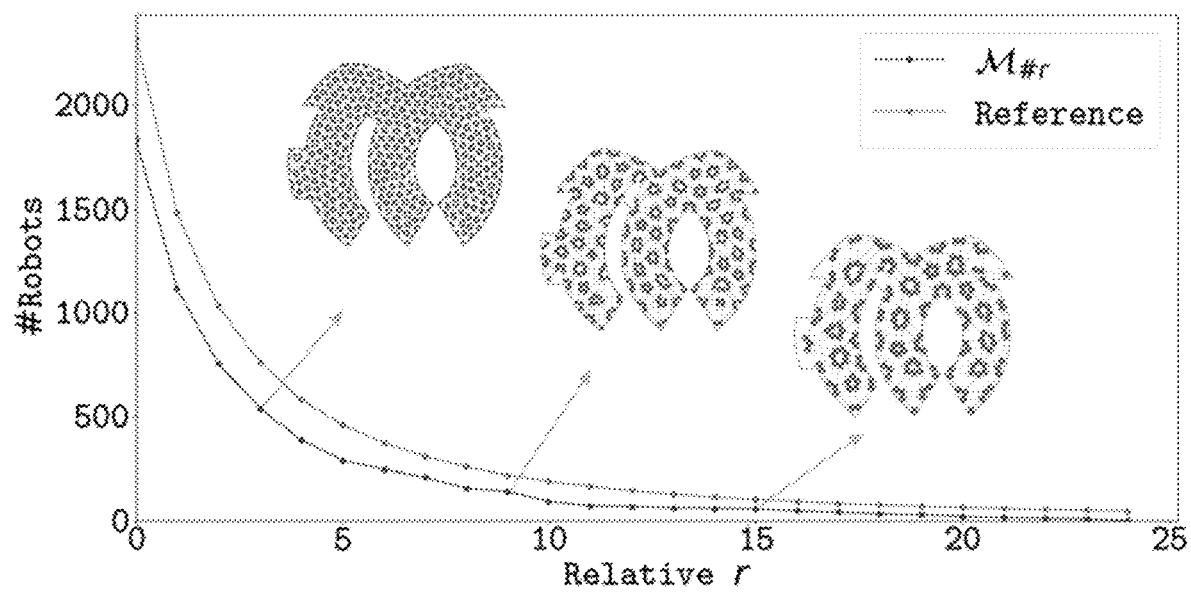
FIG. 16 illustrates a relationship chart between number of robots and robot sizes based on experiments conducted consistent with certain embodiments of the present disclosure.

Additional experiments were conducted to profile the influence of different robot radius, as shown in FIG. 16. Using arrangement of robots described in previous embodiments, regular triangles with the optimal area A* were used to cover $\mathcal{W}$ and then triangles that are outside $\mathcal{W}$ were removed. The radius r were changed, the change of $\mathcal{M}_{\#r}$ against r were plotted. The ideal curve $3|\mathcal{W}|/A^*$ was also plotted in the same figure for comparison. As shown in FIG. 16, the curve obtained from experiment results closely matches the ideal reference curve for different r.

Figure 18:
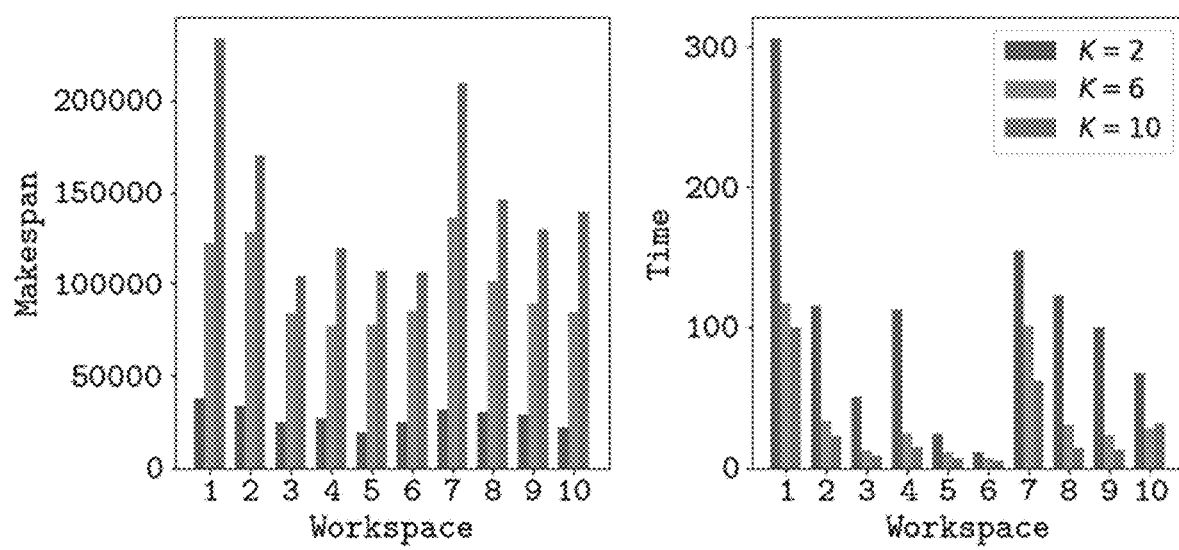
FIG. 18 illustrates experiment results of computation times and makespan under different congestion-levels in 10 different workspaces consistent with certain embodiments of the present disclosure.

The generated graph embedding $\mathcal{G}$ allows conflict-based search (CBS) algorithm to solve discrete MPP instances. The graph shown in FIG. 17 with 1128 nodes were used to test an example CBS algorithm (Andreychuk, Anton, et al. "Multi-agent pathfinding with continuous time." *Artificial Intelligence* (2022): 103662.) Table 5 shows computational time of the CBS algorithm executed for discrete MPP instances with varying numbers of robots. "-" denotes no solution found. The computing time of such algorithms vary greatly with respect to the number of robots. In one experiment, CBS could not find optimal solutions for a discrete MPP instance with 20 robots even after hours computing on the graph shown in FIG. 17.

ments, the makespan reduces linearly with K. In these experiments, each MAPF problem was randomly generated, and the algorithms were executed 5 times to obtain sound statistics. As shown in FIG. 18, when more and more vacant vertices (corresponding to smaller K where more parallelizable clusters can be computed to speed-up the scheduling process), the rate of acceleration of the disclosed approach is more obvious. This clearly demonstrated benefits of the proposed space-time search algorithm in handling highly congested robot swarms.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments

Figure 17:
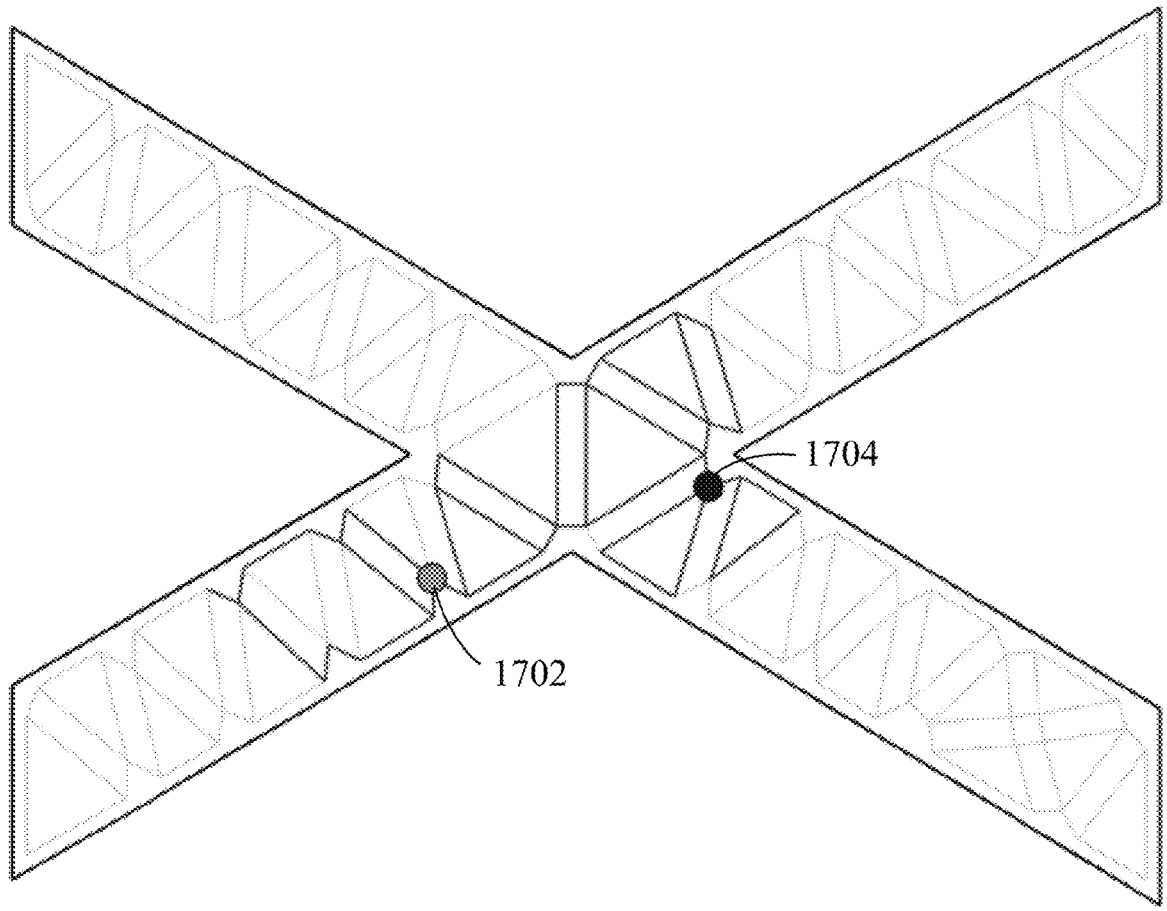
FIG. 17 illustrates an example graph and a planned path from an experiment conducted consistent with certain embodiments of the present disclosure.

TABLE 5 computational time of CBS algorithm executed for discrete MPP instances
with varying numbers of robots on the graph shown in FIG. 17

| #Robot | 10 | 11 | 12 | 13 | 14 | 15 | 16 | 17 | 18 | 19 | 20 | 25 | 30 |
|---|---|---|---|---|---|---|---|---|---|---|---|---|---|
| time (s) | 0.001 | 0.047 | — | — | 0.217 | — | 0.007 | 0.344 | 15.7 | — | — | — | — |

By comparison, using the disclosed parallel discrete MPP scheduler according to Table 4 on the graph shown in FIG. 17, all discrete MPP instances can be processed with thousands of robots within 6 minutes. The path shown in FIG. 17 is an example sub-optimal path among 66 paths found using the disclosed discrete MPP scheduler. Nodes 1702 and 1704 respectively denotes the start position (i.e., origin) and goal position (i.e., destination).

FIG. 18 shows a summary experiment result of average makespan and running time (measured in seconds) for 10 environments under three different K. For most environdescribed above are merely exemplary. For example, the division of the units is merely the division of logic functions and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware or can be implemented in the form of a software function unit.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A multi-agent path planning method, comprising:
   obtaining a two-dimensional (2D) floor plan of a space;
   generating an initial mesh of the 2D floor plan, the initial mesh discretizing the 2D floor plan into a plurality of triangle cells;
   performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; and
   converting the target mesh into a target graph, each vertex of the target graph representing a position that an agent can reside at, and each edge of the target graph representing a path that an agent can travel on;
   wherein the target graph is used for planning paths for a plurality of agents according to origins and destinations of the plurality of agents in the space, and the agents traveling on the planned paths do not collide with each other.

2. The method according to claim 1, wherein at least one re-meshing operator of a re-meshing operator group is used in the mesh optimization process, the re-meshing operator group including an edge-flip operator, an edge-split operator, an edge-collapse operator, a vertex-smoothing operator, a local-optimization operator, and a global-optimization operator.

3. The method according to claim 2, wherein:
   the local-optimization operator is configured to determine positions of a plurality of vertices in a local area that maximizes a total area of valid cells in a mesh, wherein a triangle cell of a mesh is a valid cell when agents placed on three corner points of the cell and performing cyclic moves on edges of the cell are collision-free; and
   the global-optimization operator is configured to determine positions of a plurality of vertices in the mesh that maximizes the total area of the valid cells in the mesh.

4. The method according to claim 2, wherein performing the optimization process comprises:
   performing k passes of iterations, k being a positive integer,
   wherein in each pass of iterations, re-meshing operators are selected from the re-meshing operator group and are sequentially used, to obtain a result mesh that improves the value of a metric function, and
   the result mesh corresponding to a pass other than kth pass is identified as a current candidate mesh to initiate a next pass of the iterations, and the result mesh corresponding to the kth pass is identified as the target mesh.

5. The method according to claim 4, wherein k is 2, and a number of the re-meshing operators used in the 1st pass of the iterations is greater than a number of the re-meshing operators used in the 2nd pass of the iterations.

6. The method according to claim 4, further comprising:
   in each pass of iterations, performing the following:
   using a current re-meshing operator of the re-meshing operators corresponding to a current pass on a current candidate mesh to obtain a subsequent candidate mesh;
   determining a metric value corresponding to the subsequent candidate mesh according to the metric function;
   determining whether the metric value of the subsequent candidate mesh satisfies a condition related to a metric value corresponding to the current candidate mesh;
   when the metric value of the subsequent candidate mesh satisfies the condition, identifying the subsequent candidate mesh as the current candidate mesh and returning to the step of using the current re-meshing operator on the current candidate mesh;
   when the metric value of the subsequent candidate mesh does not satisfy the condition and when the current re-meshing operator is not a last operator in the re-meshing operator group, identifying a next re-meshing operator of the re-meshing operators corresponding to the current pass as the current re-meshing operator and returning to the step of using the current re-meshing operator on the current candidate mesh;
   when the metric value of the subsequent candidate mesh does not satisfy the condition and when the current re-meshing operator is the last operator in the re-meshing operator group, stopping the current pass of iterations and determining the current candidate mesh as the result mesh of the current pass.

7. The method according to claim 4, further comprising:
   in each pass of iterations, performing the following:
   sequentially using the re-meshing operators corresponding to a current pass on the current candidate mesh to obtain a subsequent candidate mesh;
   determining a metric value corresponding to the subsequent candidate mesh according to the metric function;
   determining whether the metric value of the subsequent candidate mesh is greater than a metric value corresponding to the current candidate mesh;
   when the metric value of the subsequent candidate mesh is greater, identifying the subsequent candidate mesh as the current candidate mesh and returning to the step of sequentially using the re-meshing operators corresponding to the current pass on the current candidate mesh; and
   when the metric value of subsequent candidate mesh is not greater, stopping the current pass of interactions and identifying the subsequent candidate mesh as the result mesh of the current pass.

8. The method according to claim 1, wherein converting the target mesh into a target graph comprises:
for each triangular cell in the target mesh,
adding three corner points on inner corners of the triangular cell to the target graph as vertices of a loop, each corner point located at a point away from two consecutive edges of the triangular cell by a distance r, the distance r equaling a radius of an agent represented by the vertex; and
adding edges that connect every pair of the three corner points to the target graph as loop edges, a loop edge being a path along which a cyclic move can be performed by an agent inside the same cell;
adding inter-cell edges between two pairs of corner points sharing an edge in the target mesh to the target graph, an inter-cell edge being a path along which a vacant move can be performed by an agent across two cells; and
removing, from the target graph, vertices of an invalid cell, the invalid cell being a cell where the three corner points or the cyclic move performed on loop edges are not collision-free.

9. The method according to claim 8, further comprising: provided that $\bar{x}_1$, $\bar{x}_2$ and $\bar{x}_3$ denote positions of vertices of a triangle cell in the target mesh, $x_1$, $x_2$, and $x_3$ denote positions of the three corner points of a loop in the target graph corresponding to the triangle cell in the target mesh,
determining that a triangle cell is valid when the following formula is satisfied:

$$\left(\frac{1}{4}\|2x_2 - x_1 - x_3\|^2 + \alpha_4\right)\left(\frac{1}{4}\|x_1 - x_3\|^2 - 4r^2 - \alpha_4\right) \geq \left[\frac{1}{4}(x_1 - x_3)(2x_2 - x_1 - x_3)\right]^2 \wedge \alpha_4 \geq 0$$

wherein a position of vertex $x_2$ is calculated by $$x_2 = \bar{x}_2 + r\frac{(\bar{x}_3 - \bar{x}_2)\|\bar{x}_1 - \bar{x}_2\| + (\bar{x}_1 - \bar{x}_2)\|\bar{x}_3 - \bar{x}_2\|}{\|(\bar{x}_3 - \bar{x}_2) \times (\bar{x}_1 - \bar{x}_2)\|}.$$

10. The method according to claim 1, wherein planning the paths for the plurality of agents comprises:
identifying a plurality of sub-graphs in the target graph, each sub-graph including at least one vacant vertex and being connected with a neighboring sub-graph by an inter-cell edge; and
recursively swapping, according to the origins and destinations of the agents, a plurality of agents between two sub-graphs until $x_i$ and $x_{\sigma(i)}$ belongs to the same sub-graph for all $i=1, \ldots, N$, wherein $x_i$ denotes an origin of an ith agent, $\sigma$ denotes a position permutation, and $x_{\sigma(i)}$ denotes a destination of the ith agent.

11. The method according to claim 10, wherein identifying a plurality of sub-graphs in the target graph comprises:
generating a binary tree of the target graph, each leaf node of the binary tree representing a sub-graph of the target graph that includes at least two loops and a vacant vertex not occupied by an agent, and two child nodes of a same parent node in the binary tree representing two sub-graphs corresponding to the two child nodes are directly connected by an inter-cell edge;
wherein the plurality of agents are recursively sapped between two sub-graphs from child nodes of a root node to all leaf nodes of the binary tree until $x_i$ and $x_{\sigma(i)}$ belongs to the same sub-graph for all $i=1, \ldots, N$; and
the swapping of agents within different sub-trees are performed in parallel.

12. The method according to claim 11, wherein planning the paths for the plurality of agents further comprises: scheduling parallel agent position swaps between sub-graphs, including:
building a space-time graph $\langle\{\mathcal{G}_{i,t}|t \leq t_0+1\}, \{e_{ij,t}|t \leq t_0\}\rangle$, wherein t denotes a round count, an agent can move along one edge in the target graph in each round, $t_0$ denotes a maximal allowed number of rounds in a current iteration, $\mathcal{G}_{i,t}$ denotes a state of ith leaf node at a beginning of tth round, $e_{ij,t}$ denotes a space-time edge representing a direction from $e_{j,t+1}$ to $e_{i,t}$ when leaf nodes $\mathcal{G}_i$ and $\mathcal{G}_j$ are connected by an inter-loop edge, $\mathcal{G}_i$ and $\mathcal{G}_j$ belong to a same sub-graph, and i, $j \leq N_1$ or $N_1 < i$, $j \leq N_1+N_2$;
for each pair of connected leaf nodes $\langle \mathcal{G}_{a,t}, \mathcal{G}_{b,t}\rangle$ belonging to different sub-graphs, finding two shortest paths connecting from $\mathcal{G}_{a,t}$, $\mathcal{G}_{b,t}$ to a leaf node containing an agent that belongs to a different sub-graph
running Dijkstra's algorithm from $\mathcal{G}_{a,t}$, $\mathcal{G}_{b,t}$ until a $\mathcal{G}_{i,t'}$ satisfying formula $$\min_{t'=t,\ldots,t_0}(\#\mathcal{G}_{i,t'}) > 0$$

is found, to obtain one or more inter-sub-graph position swaps;
removing conflicting space-time edges; and
when no position swaps can be found for $t_0$ of the current iteration, increasing $t_0$ by 1 and starting a next iteration.

13. The method according to claim 12, wherein removing conflicting space-time edges comprises: provided that the space-time edge $e_{ij,t}$ is selected,
removing space-time edges $\{e_{kj,t}, e_{ik,t}|k=1, \ldots, N_1+N_2\}$;
removing space-time edges $\{e_{ak,t}, e_{bk,t}|k=1, \ldots, N_1+N_2\}$; and
removing space-time edges $$\left\{e_{kj,t} \middle| \min_{t'=t,\ldots,t_0} \#/\mathcal{G}_{j,t'} = 0 \wedge k = 1, \ldots, N_1+N_2\right\},$$

wherein $\#_l\mathcal{G}_{j,t}$ denotes a number of agents belonging to a same sub-graph as $\mathcal{G}_j$ at the beginning of tth round.

14. A device for multi-agent path planning, comprising a memory and a processor coupled to the memory, the processor being configured to perform:
obtaining a two-dimensional (2D) floor plan of a space;
generating an initial mesh of the 2D floor plan, the initial mesh discretizing the 2D floor plan into a plurality of triangle cells;
performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; and converting the target mesh into a target graph, each vertex of the target graph representing a position that an agent can reside at, and each edge of the target graph representing a path that an agent can travel on;

wherein the target graph is used for planning paths for a plurality of agents according to origins and destinations of the plurality of agents in the space, and the agents traveling on the planned paths do not collide with each other.

15. The device according to claim 14, wherein at least one re-meshing operator of a re-meshing operator group is used in the mesh optimization process, the re-meshing operator group including an edge-flip operator, an edge-split operator, an edge-collapse operator, a vertex-smoothing operator, a local-optimization operator, and a global-optimization operator.

16. The device according to claim 15, wherein:

the local-optimization operator is configured to determine positions of a plurality of vertices in a local area that maximizes a total area of valid cells in a mesh, wherein a triangle cell of a mesh is a valid cell when agents placed on three corner points of the cell and performing cyclic moves on edges of the cell are collision-free; and the global-optimization operator is configured to determine positions of a plurality of vertices in the mesh that maximizes the total area of the valid cells in the mesh.

17. The device according to claim 15, wherein performing the optimization process comprises:

performing k passes of iterations, k being a positive integer, wherein in each pass of iterations, re-meshing operators are selected from the re-meshing operator group and are sequentially used to obtain a result mesh that improves the value of a metric function, and the result mesh corresponding to a pass other than kth pass is identified as a current candidate mesh to initiate a next pass of the iterations, and the result mesh corresponding to the kth pass is identified as the target mesh.

18. The device according to claim 17, wherein k is 2, and a number of the re-meshing operators used in the 1st pass of the iterations is greater than a number of the re-meshing operators used in the 2nd pass of the iterations.

19. The device according to claim 14, wherein converting the target mesh into a target graph comprises:

for each triangular cell in the target mesh, adding three corner points on inner corners of the triangular cell to the target graph as vertices of a loop, each corner point located at a point away from two consecutive edges of the triangular cell by a distance r, the distance r equaling a radius of an agent represented by the vertex; and adding edges that connect every pair of the three corner points to the target graph as loop edges, a loop edge being a path along which a cyclic move can be performed by an agent inside the same cell;

adding inter-cell edges between two pairs of corner points sharing an edge in the target mesh to the target graph, an inter-cell edge being a path along which a vacant move can be performed by an agent across two cells; and removing, from the target graph, vertices of an invalid cell, the invalid cell being a cell where the three corner points or the cyclic move performed on loop edges are not collision-free.

20. A non-transitory storage medium storing computer instructions that, when executed by a processor, causing the processor to perform:

obtaining a two-dimensional (2D) floor plan of a space;

generating an initial mesh of the 2D floor plan, the initial mesh discretizing the 2D floor plan into a plurality of triangle cells;

performing a mesh optimization process based on the initial mesh to find a target mesh that maximizes a value of a metric function, the metric function including at least: a term reflecting a number of agents that a graph corresponding to a candidate mesh can hold and a term reflecting a number of agents in a largest connected component of the graph corresponding to the candidate mesh, the candidate mesh being a mesh obtained in the mesh optimization process; and converting the target mesh into a target graph, each vertex of the target graph representing a position that an agent can reside at, and each edge of the target graph representing a path that an agent can travel on;

wherein the target graph is used for planning paths for a plurality of agents according to origins and destinations of the plurality of agents in the space, and the agents traveling on the planned paths do not collide with each other.

* * * * *